(12) United States Patent
Yamanaka et al.

(10) Patent No.: US 7,632,212 B2
(45) Date of Patent: Dec. 15, 2009

(54) HYBRID VEHICLE AND CONTROL METHOD OF THE SAME

(75) Inventors: Akihiro Yamanaka, Okazaki (JP); Yukio Onishi, Nagoya (JP); Takeshi Yasuda, Kuwana (JP); Hideo Itano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 486 days.

(21) Appl. No.: 11/602,282

(22) Filed: Nov. 21, 2006

(65) Prior Publication Data

US 2007/0298928 A1 Dec. 27, 2007

(30) Foreign Application Priority Data

Nov. 25, 2005 (JP) ............................. 2005-340371

(51) Int. Cl.
*B60W 10/04* (2006.01)
(52) U.S. Cl. ..................... 477/107; 477/15; 477/110
(58) Field of Classification Search ............... 477/15, 477/17, 107, 108, 110
See application file for complete search history.

(56) References Cited

U.S. PATENT DOCUMENTS

| | | | | |
|---|---|---|---|---|
| 4,615,410 A | * | 10/1986 | Hosaka | ............... 180/197 |
| 6,017,290 A | * | 1/2000 | Kinoshita et al. | ........... 477/108 |
| 6,304,809 B1 | * | 10/2001 | Cullen et al. | .................. 701/93 |
| 6,792,344 B2 | * | 9/2004 | Minowa et al. | ............... 701/96 |

FOREIGN PATENT DOCUMENTS

| | | |
|---|---|---|
| JP | 63-085533 | 6/1988 |
| JP | 08-295154 | 11/1996 |
| JP | 2000-120460 | 4/2000 |
| JP | 2000-213386 A | 8/2000 |
| JP | 2000-008902 | 1/2002 |
| JP | 2002-052951 | 2/2002 |
| JP | 2003-343305 | 12/2003 |

* cited by examiner

*Primary Examiner*—Ha D. Ho
(74) *Attorney, Agent, or Firm*—Kenyon & Kenyon LLP

(57) ABSTRACT

In the case of the on setting of an eco switch signal ESW, when a torque demand Tr* is less than a good fuel consumption-assuring minimum torque Temin, the hybrid vehicle of the invention stops the operation of an engine and controls a motor MG2 to output a required torque for constant speed drive. When the torque demand Tr* is not less than the good fuel consumption-assuring minimum torque Temin, on the other hand, the engine is driven at a drive point in a good fuel consumption range among drive points on an optimum fuel consumption operation curve to ensure output of the required torque for the constant speed drive. Such control enhances the fuel efficiency for the constant speed drive.

20 Claims, 11 Drawing Sheets

HYBRID VEHICLE AND CONTROL METHOD OF THE SAME

BACKGROUND OF THE INVENTION

1. Technical Field

The present invention relates to a hybrid vehicle and a control method of the hybrid vehicle.

2. Description of the Related Art

One proposed constant speed drive technique for automobile performs acceleration control to maximize the fuel economy against the throttle opening in response to the driver's on operation of a fuel economy drive mode selection switch (see, for example, Japanese Utility Model Laid-Open Gazette No. S63-85533). Another proposed constant speed drive technique for automobile sets an upper limit of engine rotation speed in response to selection of a fuel economy mode (see, for example, Japanese Patent Laid-Open Gazette No. 2003-343305). One proposed technique for the enhanced fuel efficiency on an upload drive specifies a maximum fuel efficiency vehicle speed in a range of ±10 km/h from a tentative target vehicle speed and sets the specified maximum fuel efficiency vehicle speed to the target vehicle speed (see, for example, Japanese Patent Laid-Open Gazette No. H08-295154). One proposed technique for hybrid vehicle keeps constant engine output during constant speed drive to enhance the fuel efficiency (see, for example, Japanese Patent Laid-Open Gazette No. 2000-8902).

SUMMARY OF THE INVENTION

Regardless of whether the automobile is hybrid configuration or not, one of the general requirements is to enhance the fuel efficiency for the constant speed drive. Unsmooth constant speed drive due to the enhanced fuel efficiency, however, undesirably worsens the drive feeling. There is accordingly a need of enhancing the fuel efficiency while keeping some good level of drive feeling.

The hybrid vehicle of the invention and the corresponding control method of the hybrid vehicle thus aim to enhance fuel efficiency for constant speed drive. The hybrid vehicle of the invention and the corresponding control method of the hybrid vehicle also aim to satisfy both enhanced fuel efficiency and smooth constant speed drive. The hybrid vehicle of the invention and the corresponding control method of the hybrid vehicle also aim to satisfy both noise reduction and smooth constant speed drive.

In order to attain at least part of the above and the other related objects, the hybrid vehicle of the invention and the corresponding control method of the hybrid vehicle have the configurations discussed below.

The present invention is directed to a first hybrid vehicle. The hybrid vehicle includes: an internal combustion engine that is driven to output power for driving the hybrid vehicle; a motor that is driven to output power for driving the hybrid vehicle; a target vehicle speed setting unit that sets a target vehicle speed for constant speed drive of the hybrid vehicle; a mode selection unit that selectively activates either a normal drive mode or a fuel economy priority mode, which places the greater importance on fuel efficiency, in response to a driver's operation; a vehicle speed measurement unit that measures a vehicle speed; and a constant speed drive control module that, during normal constant speed drive with selective activation of the normal drive mode by the mode selection unit and with setting of the target vehicle speed by the target vehicle speed setting unit, controls the internal combustion engine and the motor to drive the internal combustion engine on a specific drive point curve satisfying a predetermined condition with possible intermittent operation and to make the measured vehicle speed approach to the set target vehicle speed, and during fuel economy-priority constant speed drive with selective activation of the fuel economy priority mode by the mode selection unit and with setting of the target vehicle speed by the target vehicle speed setting unit, the constant speed drive control module controlling the internal combustion engine and the motor to drive the internal combustion engine in an efficient drive point range on the specific drive point curve satisfying the predetermined condition with possible intermittent operation and to make the measured vehicle speed approach to the set target vehicle speed.

During the normal constant speed drive with selection of the normal drive mode and setting of the target vehicle speed for the constant speed drive, the first hybrid vehicle of the invention controls the internal combustion engine and the motor to drive the internal combustion engine on the specific drive point curve satisfying the predetermined condition with possible intermittent operation and to make the measured vehicle speed approach to the set target vehicle speed. During the fuel economy-priority constant speed drive with selection of the fuel economy priority mode, which places the greater importance on fuel efficiency, and setting of the target vehicle speed for the constant speed drive, the first hybrid vehicle of the invention controls the internal combustion engine and the motor to drive the internal combustion engine in the efficient drive point range on the specific drive point curve satisfying the predetermined condition with possible intermittent operation and to make the measured vehicle speed approach to the set target vehicle speed. Such drive control effectively enhances the fuel efficiency for the constant speed drive.

In one preferable embodiment of the first hybrid vehicle of the invention, during the fuel economy-priority constant speed drive, when a vehicle speed difference between the measured vehicle speed and the set target vehicle speed is not less than a preset reference value, the constant speed drive control module controls the internal combustion engine and the motor to drive the internal combustion engine on the specific drive point curve satisfying the predetermined condition and to make the measured vehicle speed approach to the set target vehicle speed. Further, during the fuel economy-priority constant speed drive, when the vehicle speed difference between the measured vehicle speed and the set target vehicle speed is less than the preset reference value, the constant speed drive control module may control the internal combustion engine and the motor to drive the internal combustion engine in the efficient drive point range and to make the measured vehicle speed approach to the set target vehicle speed. Even during the fuel economy-priority constant speed drive, when the vehicle speed difference between the measured vehicle speed and the set target vehicle speed is not less than the preset reference value, the first hybrid vehicle of this arrangement performs the drive control similar to that performed during the normal constant speed drive. This desirably satisfies both the enhanced fuel efficiency and the smooth constant speed drive.

In another preferable embodiment of the first hybrid vehicle of the invention, the constant speed drive control module controls the internal combustion engine and the motor to increase output of a constant speed driving force with an increase in vehicle speed difference between the measured vehicle speed and the set target vehicle speed, in order to cancel out the vehicle speed difference. In this case, during the fuel economy-priority constant speed drive, when operation of the internal combustion engine in the efficient drive point range causes output of a driving force of not less than the constant speed driving force, the constant speed drive control module may stop the operation of the internal combustion engine and controls the motor to output the constant speed driving force. Further, during the fuel economy-priority constant speed drive, when operation of the internal combustion engine in the efficient drive point range causes output of the driving force of not less than the constant speed driving force but when the motor is not allowed to output the constant speed driving force, the constant speed drive control module may control the motor to output an allowable level of driving force until output of the constant speed driving force is enabled from the internal combustion engine driven in the efficient drive point range. Moreover, during the fuel economy-priority constant speed drive, when operation of the internal combustion engine in the efficient drive point range causes output of the driving force of not less than the constant speed driving force but when the motor is not allowed to output the constant speed driving force, the constant speed drive control module may control the internal combustion engine to be driven in the efficient drive point range.

In still another preferable embodiment of the first hybrid vehicle of the invention, the predetermined condition is that the internal combustion engine is driven at an efficient drive point among drive points of outputting an identical power, and in the efficient drive point range, the internal combustion engine is driven at a rotation speed of not lower than a preset level. This arrangement enables easy setting of the efficient drive point range and attains the constant speed drive of the hybrid vehicle.

The present invention is also directed to a second hybrid vehicle. The second hybrid vehicle includes: an internal combustion engine that is driven to output power for driving the hybrid vehicle; a motor that is driven to output power for driving the hybrid vehicle; a target vehicle speed setting unit that sets a target vehicle speed for constant speed drive of the hybrid vehicle; a mode selection unit that selects a control mode, in response to a driver's operation; a vehicle speed measurement unit that measures a vehicle speed; and a constant speed drive control module that, in the case of setting the target vehicle speed by the target vehicle speed setting unit, controls the internal combustion engine and the motor in the selected control mode to make the measured vehicle speed approach to the set target vehicle speed with intermittent operation of the internal combustion engine.

In the case of setting the target vehicle speed, the second hybrid vehicle of the invention controls the internal combustion engine and the motor in the selected control mode to make the measured vehicle speed approach to the set target vehicle speed with intermittent operation of the internal combustion engine. Namely the constant speed drive control is performed in the selected control mode. This arrangement enables the appropriate constant speed drive.

In accordance with one aspect of the second hybrid vehicle of the invention, the mode selection unit selects a control mode among plural options including a normal drive mode where the internal combustion engine is driven on a specific drive point curve satisfying a predetermined condition, a fuel economy priority mode where the internal combustion engine is driven in an efficient drive point range on the specific drive point curve satisfying the predetermined condition, and a noise reduction mode where the internal combustion engine is driven in a noise reduction drive point range satisfying a noise reduction condition for preventing occurrence of certain noise. Selection of the fuel economy priority mode for the control mode enhances the fuel efficiency for the constant speed drive. Selection of the noise reduction mode for the control mode effectively prevents the occurrence of certain noise during the constant speed drive. Namely selection of the fuel economy priority mode satisfies both the enhanced fuel efficiency and the smooth constant speed drive, whereas selection of the noise reduction mode satisfies both the noise reduction and the smooth constant speed drive.

In one preferable embodiment of the second hybrid vehicle selecting the control mode among plural options including a normal drive mode, a fuel economy priority mode and a noise reduction mode of the invention, in the case of selection of the fuel economy priority mode, when a vehicle speed difference between the measured vehicle speed and the set target vehicle speed is less than a preset reference value, the constant speed drive control module controls the internal combustion engine and the motor to drive the internal combustion engine on the specific drive point curve satisfying the predetermined condition and to make the measured vehicle speed approach to the set target vehicle speed, while in the case of selection of the fuel economy priority mode, when the vehicle speed difference between the measured vehicle speed and the set target vehicle speed is not less than the preset reference value, the constant speed drive control module controls the internal combustion engine and the motor to drive the internal combustion engine in the efficient drive point range and to make the measured vehicle speed approach to the set target vehicle speed. This arrangement effectively satisfies both the enhanced fuel efficiency and the smooth constant speed drive.

In another preferable embodiment of the second hybrid vehicle selecting the control mode among plural options including a normal drive mode, a fuel economy priority mode and a noise reduction mode of the invention, in the case of selection of the noise reduction mode, when a vehicle speed difference between the measured vehicle speed and the set target vehicle speed is less than a preset reference value, the constant speed drive control module controls the internal combustion engine and the motor to drive the internal combustion engine on the specific drive point curve satisfying the predetermined condition and to make the measured vehicle speed approach to the set target vehicle speed, while in the case of selection of the noise reduction mode, when the vehicle speed difference between the measured vehicle speed and the set target vehicle speed is not less than the preset reference value, the constant speed drive control module controls the internal combustion engine and the motor to drive the internal combustion engine in the noise reduction drive point range satisfying the noise reduction condition and to make the measured vehicle speed approach to the set target vehicle speed. This arrangement effectively satisfies both the noise reduction and the smooth constant speed drive.

In still another preferable embodiment of the second hybrid vehicle selecting the control mode among plural options including a normal drive mode, a fuel economy priority mode and a noise reduction mode of the invention, the second hybrid vehicle further include an accumulator unit that is capable of inputting and outputting electric power from and to the motor. When a state of charge of the accumulator unit is in a predetermined range, the constant speed drive control module may control the internal combustion engine and the motor in the control mode selected by the mode selection unit to make the measured vehicle speed approach to the set target vehicle speed, while when the state of charge of the accumulator unit is out of the predetermined range, the constant speed drive control module may control the internal combustion engine and the motor in the normal drive mode, regardless of the control mode selected by the mode selection unit, to make the measured vehicle speed approach to the set target vehicle speed. This arrangement ensures constant-speed drive of the hybrid vehicle according to the state of charge of the accumulator unit.

In still another preferable embodiment of the second hybrid vehicle selecting the control mode among plural options including a normal drive mode, a fuel economy priority mode and a noise reduction mode of the invention, the predetermined condition is that the internal combustion engine is driven at an efficient drive point among drive points of outputting an identical power. In the efficient drive point range, the internal combustion engine may be driven at a rotation speed of not lower than a preset level, and the noise reduction condition may be omission of a low rotation speed-high torque operation range of the internal combustion engine from the predetermined condition.

In one preferable embodiment of the first and second hybrid vehicle of the present invention, the hybrid vehicle further include an electric power-mechanical power input output mechanism that is connected with an output shaft of the internal combustion engine and with an axle of the hybrid vehicle and outputs at least part of the output power of the internal combustion engine to the axle through input and output of electric power and mechanical power. Here, the electric power-mechanical power input output mechanism may have a three shaft-type power input output module that is linked to three shafts, the output shaft of the internal combustion engine, the axle, and a rotating shaft, and inputs and outputs power from and to a residual one shaft based on powers input from and output to any two shafts among the three shafts, and a generator that inputs and outputs power from and to the rotating shaft. Further, the electric power-mechanical power input output mechanism may have a pair-rotor motor that has a first rotor connected to the output haft of the internal combustion engine and a second rotor connected to the axle and is driven to rotate through relative rotation of the first rotor to the second rotor.

The present invention is also directed to a first control method of a hybrid vehicle. The hybrid vehicle has: an internal combustion engine that is driven to output power for driving the hybrid vehicle; a motor that is driven to output power for driving the hybrid vehicle; a target vehicle speed setting switch that is operated to set a target vehicle speed for constant speed drive of the hybrid vehicle; and a mode selection switch that is operated by a driver to select either a normal drive mode or a fuel economy priority mode, which places the greater importance on fuel efficiency. In the case of selection of the normal drive mode by the driver's operation of the mode selection switch and setting of the target vehicle speed by the target vehicle speed setting switch, the control method controls the internal combustion engine and the motor to drive the internal combustion engine on a specific drive point curve satisfying a predetermined condition with possible intermittent operation and to make the measured vehicle speed approach to the set target vehicle speed, and in the case of selection of the fuel economy priority mode by the driver's operation of the mode selection switch and setting of the target vehicle speed by the target vehicle speed setting switch, the control method controls the internal combustion engine and the motor to drive the internal combustion engine in an efficient drive point range on the specific drive point curve satisfying the predetermined condition with possible intermittent operation and to make the measured vehicle speed approach to the set target vehicle speed.

During the normal constant speed drive with selection of the normal drive mode and setting of the target vehicle speed for the constant speed drive, the first control method of the hybrid vehicle of the invention controls the internal combustion engine and the motor to drive the internal combustion engine on the specific drive point curve satisfying the predetermined condition with possible intermittent operation and to make the measured vehicle speed approach to the set target vehicle speed. During the fuel economy-priority constant speed drive with selection of the fuel economy priority mode, which places the greater importance on fuel efficiency, and setting of the target vehicle speed for the constant speed drive, the first control method of the hybrid vehicle of the invention controls the internal combustion engine and the motor to drive the internal combustion engine in the efficient drive point range on the specific drive point curve satisfying the predetermined condition with possible intermittent operation and to make the measured vehicle speed approach to the set target vehicle speed. Such drive control effectively enhances the fuel efficiency for the constant speed drive.

The present invention is also directed to a second control method of a hybrid vehicle. The hybrid vehicle has: an internal combustion engine that is driven to output power for driving the hybrid vehicle; a motor that is driven to output power for driving the hybrid vehicle; a target vehicle speed setting switch that is operated to set a target vehicle speed for constant speed drive of the hybrid vehicle; and a mode selection switch that is operated by a driver to select a control mode. In the case of setting the target vehicle speed by the target vehicle speed setting switch, the second control method controls the internal combustion engine and the motor in the control mode selected by the driver's operation of the mode selection switch to make the measured vehicle speed approach to the set target vehicle speed with intermittent operation of the internal combustion engine.

In the case of setting of the target vehicle speed, the second control method of the hybrid vehicle of the invention controls the internal combustion engine and the motor in the selected control mode to make the measured vehicle speed approach to the set target vehicle speed with intermittent operation of the internal combustion engine. Namely the constant speed drive control is performed in the selected control mode. This arrangement enables the appropriate constant speed drive. Here, the mode selection unit selects a control mode among plural options including a normal drive mode where the internal combustion engine is driven on a specific drive point curve satisfying a predetermined condition, a fuel economy priority mode where the internal combustion engine is driven in an efficient drive point range on the specific drive point curve satisfying the predetermined condition, and a noise reduction mode where the internal combustion engine is driven in a noise reduction drive point range satisfying a noise reduction condition for preventing occurrence of certain noise. Selection of the fuel economy priority mode for the control mode enhances the fuel efficiency for the constant speed drive. Selection of the noise reduction mode for the control mode effectively prevents the occurrence of certain noise during the constant speed drive. Namely selection of the fuel economy priority mode satisfies both the enhanced fuel efficiency and the smooth constant speed drive, whereas selection of the noise reduction mode satisfies both the noise reduction and the smooth constant speed drive.

DESCRIPTION OF THE PREFERRED EMBODIMENTS

Figure 1:
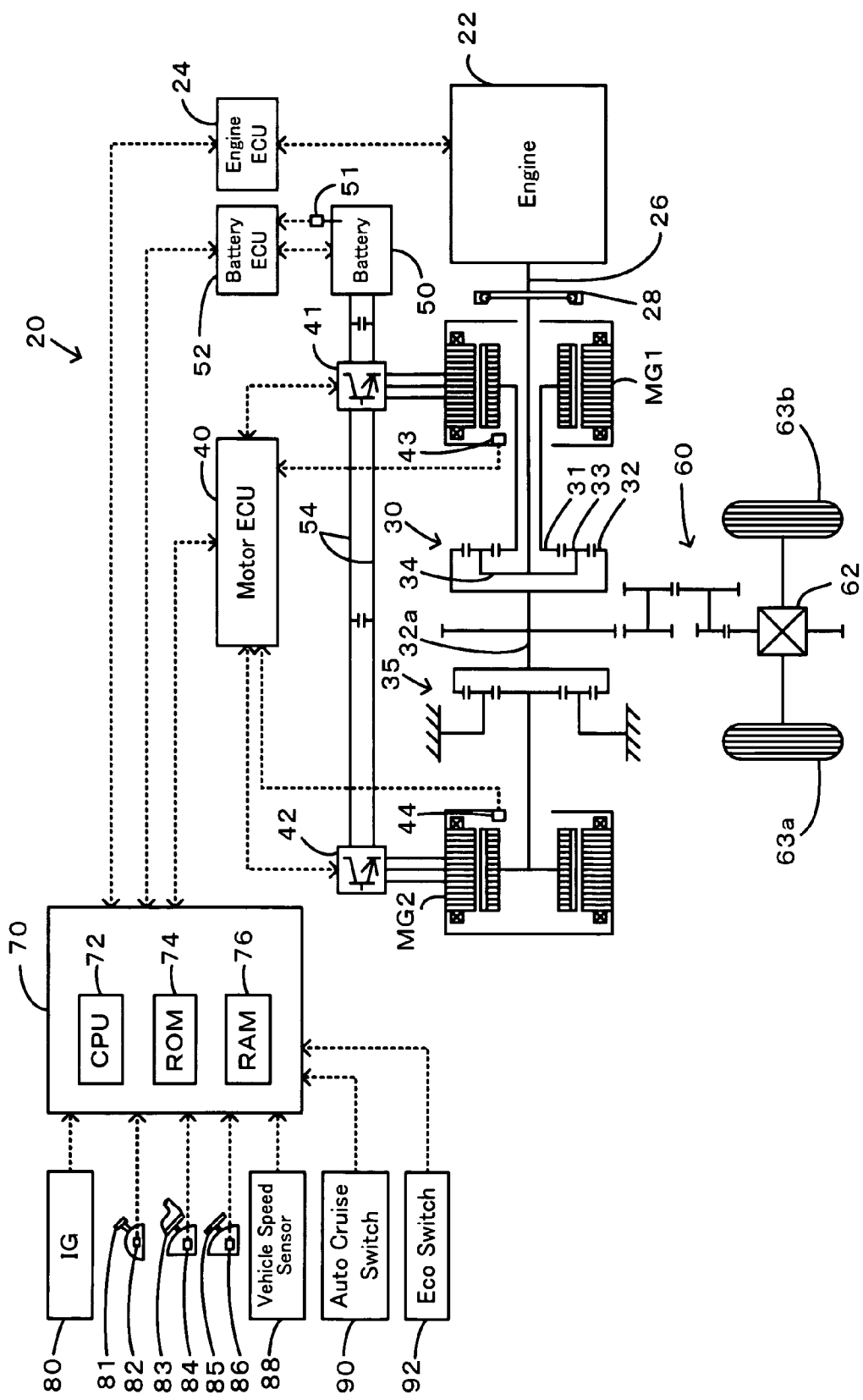
FIG. 1 schematically illustrates the configuration of a hybrid vehicle in a first embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88, an auto cruise signal ACSW from an auto cruise switch 90 giving an instruction of constant speed drive and setting a target vehicle speed for the constant speed drive, and an eco switch signal ESW from an eco switch 92 changing over the drive mode between a fuel economy priority mode for drive with priority on fuel consumption and a normal drive mode for ordinary drive. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

The description regards the operations of the hybrid vehicle 20 of the embodiment having the configuration discussed above, especially a series of constant speed drive control activated by the auto cruise signal ACSW output in response to the driver's operation of the auto cruise switch 90 to give an instruction of constant speed drive and to set a target vehicle speed V* for the constant speed drive. The auto cruise signal ACSW includes a mode operation-related signal to shift the drive mode to a constant speed drive mode for the constant speed drive and a signal of setting the target vehicle speed V*. The constant speed drive control is triggered by the driver's operation of the auto cruise switch 90 to shift the drive mode to the constant speed drive mode and to set the target vehicle speed V*.

Figure 2:
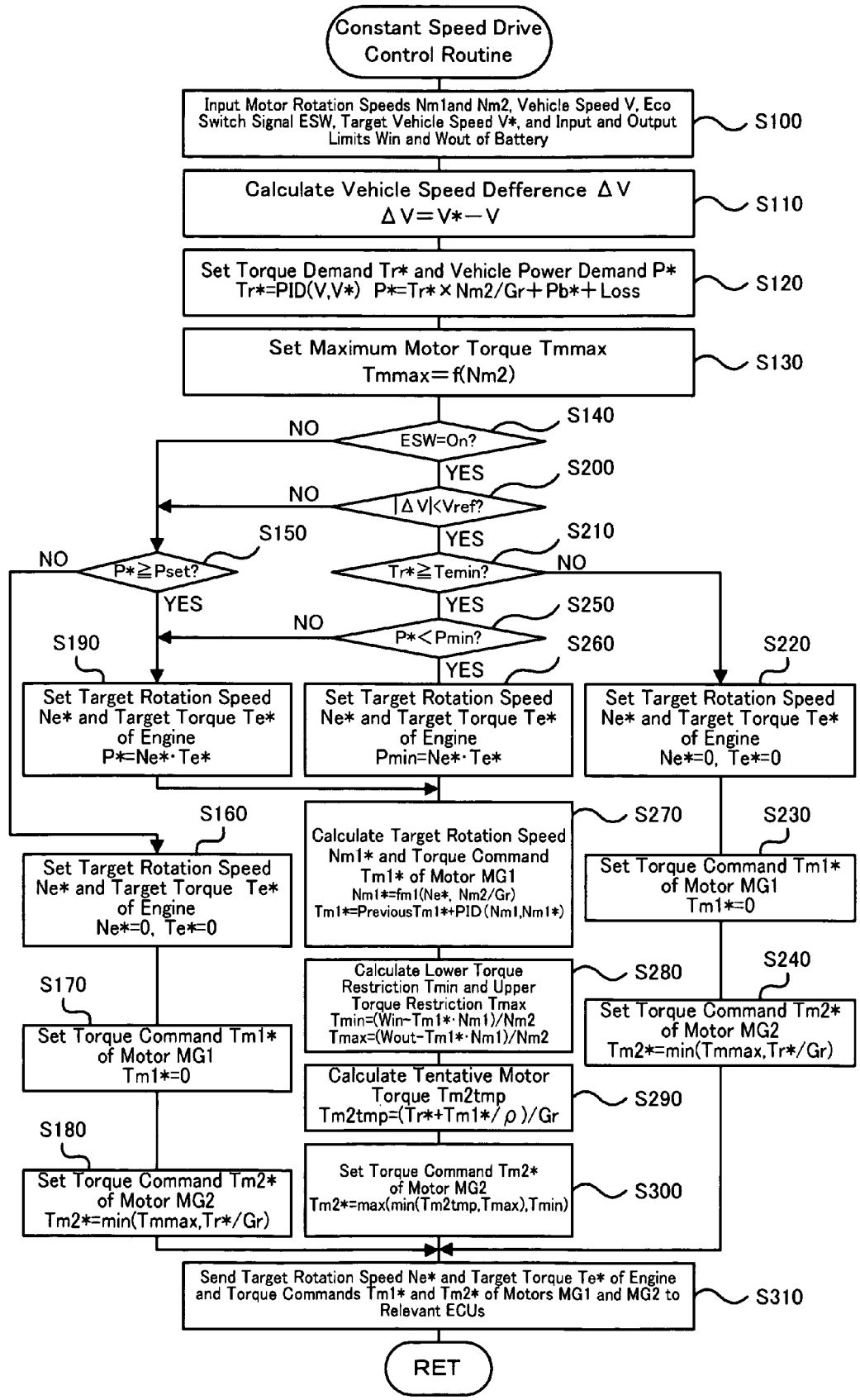
FIG. 2 is a flowchart showing a constant speed drive control routine executed by a hybrid electronic control unit in the hybrid vehicle of the first embodiment.

FIG. 2 is a flowchart showing a constant speed drive control routine executed by the hybrid electronic control unit 70 in the hybrid vehicle 20 of the embodiment. This constant speed drive control routine is performed repeatedly at preset time intervals, for example, at every several msec. In the constant speed drive control routine of FIG. 2, the CPU 72 of the hybrid electronic control unit 70 first inputs various data required for control, that is, the vehicle speed V from the vehicle speed sensor 88, rotation speeds Nm1 and Nm2 of the motors MG1 and MG2, a target vehicle speed V*, the eco switch signal ESW from the eco switch 92, and an input limit Win and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The target vehicle speed V* is set by the driver's operation of the auto cruise switch 90, is stored in a specific storage area in the RAM 76, and is read from the RAM 76. The input limit Win and the output limit Wout of the battery 50 are set based on the battery temperature Tb of the battery 50 measured by the temperature sensor 51 and the state of charge SOC of the battery 50 and are received from the battery ECU 52 by communication.

After the data input, the CPU 72 calculates a difference (vehicle speed difference) ΔV between the input target vehicle speed V* and the current vehicle speed V (step S110). In order to cancel out the calculated vehicle speed difference ΔV, the CPU 72 calculates a torque demand Tr* to be output to the ring gear shaft 32a or the driveshaft linked to the drive wheels 63a and 63b as a torque required for the hybrid vehicle 20 according to Equation (1) given below, while computing a vehicle power demand P* required for the hybrid vehicle 20 from the calculated torque demand Tr* (step S120):

$$Tr^* = k1 \cdot \Delta V + k2 \cdot \int \Delta V dt \qquad (1)$$

Here Equation (1) is a relational expression of feedback control to make the current vehicle speed V approach to the target vehicle speed V*. In Equation (1) given above, 'k1' in the first term and 'k2' in the second term on the right side respectively denote a gain of the proportional and a gain of the integral term. The vehicle power demand P* is given as the sum of the product of the calculated torque demand Tr* and a rotation speed Nr of the ring gear shaft 32a, a charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 3:
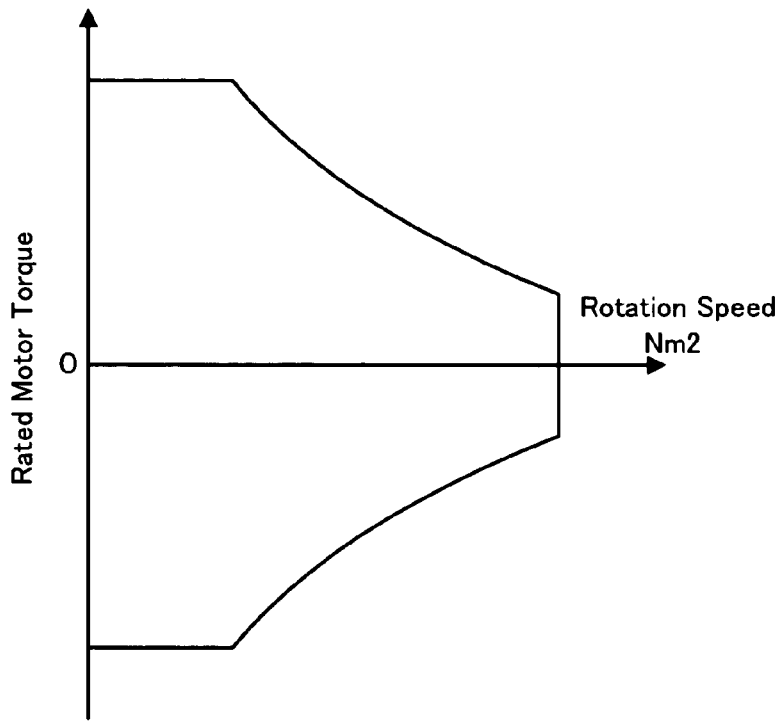
FIG. 3 is a graph showing a variation in rated torque against rotation speed $Nm2$ of a motor MG2.

A maximum motor torque Tmmax possibly output from the motor MG2 is set corresponding to the rotation speed Nm2 of the motor MG2 (step S130). The procedure of this embodiment specifies the maximum motor torque Tmmax as the maximum rated torque of the motor MG2 corresponding to the rotation speed Nm2. FIG. 3 is a graph showing a variation in rated torque of the motor MG2 against its rotation speed Nm2.

The CPU 72 then checks the setting of the input eco switch signal ESW (step S140). When the eco switch signal ESW is set off (step S140: no), selection of the normal drive mode is identified. The computed vehicle power demand P* is then compared with an engine start power Pset (step S150). The engine start power Pset represents a minimum power ensuring the engine operation of relatively high fuel efficiency and is determined according to the performance of the motor MG2 and the capacity of the battery 50. When the vehicle power demand P* is less than the engine start power Pset (step S150: no), a target rotation speed Ne* and a target torque Te* of the engine 22 and a torque command Tm1* of the motor MG1 are all set equal to 0 (steps S160 and S170) to stop the operation of the engine 22 and to drive the hybrid vehicle 20 in the motor drive mode. The smaller between the maximum motor torque Tmmax and the result of division of the torque demand Tr* by the gear ratio Gr of the reduction gear 35 is set to a torque command Tm2* of the motor MG2 (step S180). The CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S310) and terminates the constant speed drive control routine of FIG. 2. In response to input of the target rotation speed Ne* and the target torque Te* set both equal to 0, the engine ECU 24, in the operation state of the engine 22, stops fuel injection control and ignition control to stop the operation of the engine 22, and in the operation stop state of the engine 22, keeps the engine 22 stop its operation. The motor ECU 40 receives the torque commands Tm1* and Tm2* of the motors MG1 and MG2 and performs switching control of the switching elements included in the inverters 41 and 42 to drive the motors MG1 and MG2 with the torque commands Tm1* and Tm2*.

Figure 4:
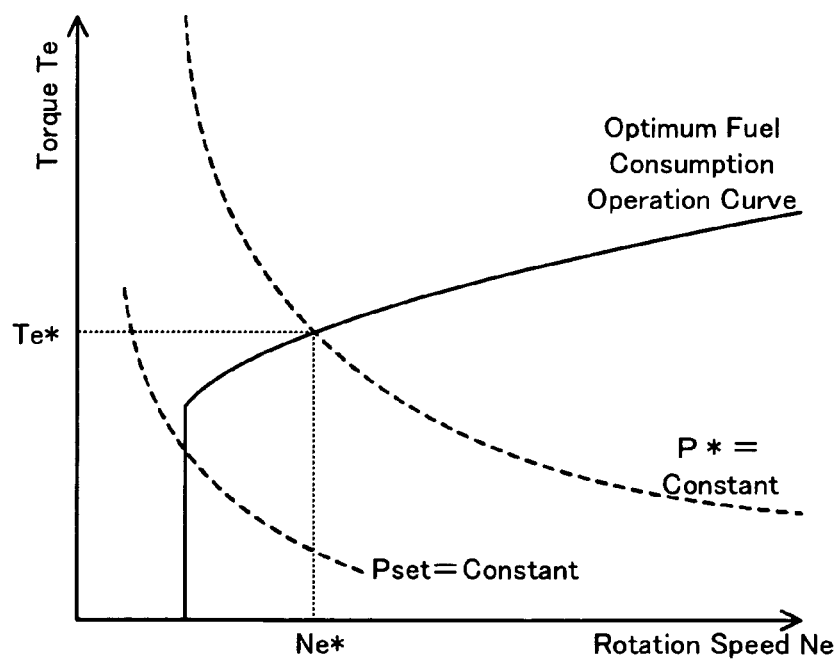
FIG. 4 shows an optimum fuel consumption operation curve of an engine to set a target rotation speed Ne* and a target torque Te* of the engine.

In the case of selection of the normal drive mode in response to the off setting of the eco switch signal ESW, when the vehicle power demand P* is not less than the engine start power Pset (step S150: yes), the target rotation speed Ne* and the target torque Te* of the engine 22 are set to ensure efficient output of the calculated vehicle power demand P* from the engine 22 (step S190). According to a concrete procedure, the target rotation speed Ne* and the target torque Te* of the engine 22 are determined according to an optimum fuel consumption operation curve and a curve of the vehicle power demand P*. The optimum fuel consumption operation curve is a line connecting most efficient drive points among the drive points of the engine 22 for outputting a fixed power. FIG. 4 shows one example of the optimum fuel consumption operation curve to set the target rotation speed Ne* and the target torque Te*. As clearly shown in FIG. 4, the target rotation speed Ne* and the target torque Te* are given as an intersection of the optimum fuel consumption operation curve and a curve of constant vehicle power demand P* (=Ne*×Te*). The engine start power Pset is also shown in the map of FIG. 4.

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (2) given below, while calculating the torque command Tm1* of the motor MG1 from the calculated target rotation speed Nm1* and the current rotation speed Nm1 of the motor MG1 according to Equation (3) given below (step S270):

$$Nm1^* = Ne^* \cdot (1+\rho)/\rho - Nm2/(Gr \cdot \rho) \quad (2)$$

$$Tm1^* = \text{Previous } Tm1^* + k3 \cdot (Nm1^* - Nm1) + k4 \cdot \int (Nm1^* - Nm1)dt \quad (3)$$

Figure 5:
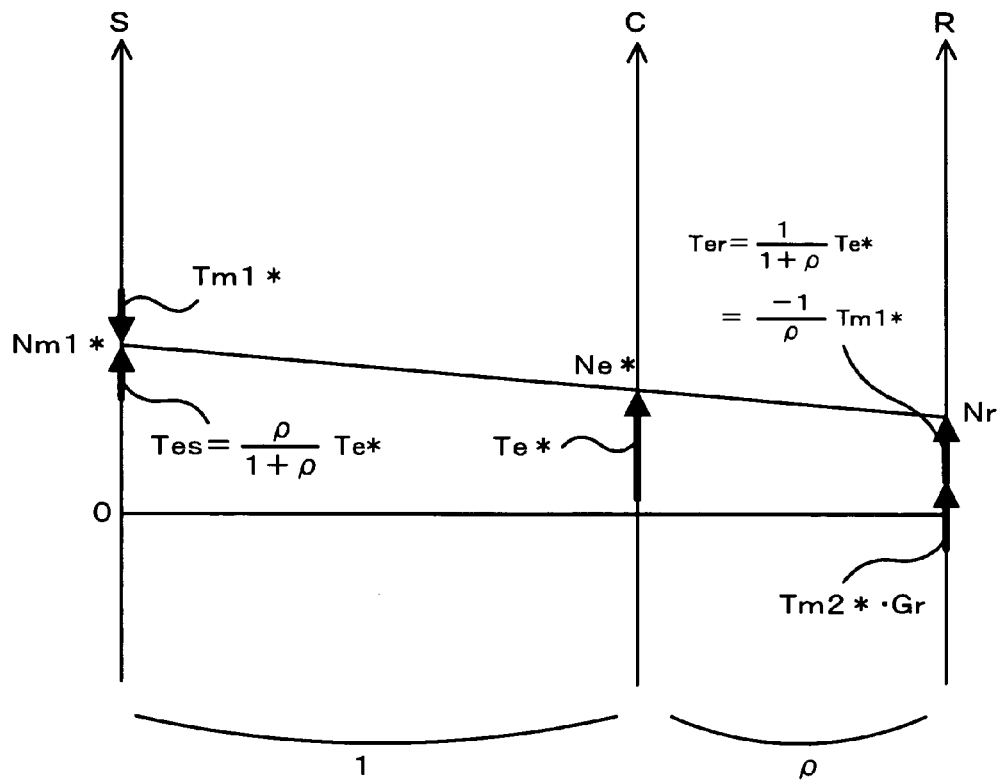
FIG. 5 is an alignment chart showing torque-rotation speed dynamics of respective rotational elements of a power distribution integration mechanism included in the hybrid vehicle of the embodiment.

Equation (2) is a dynamic relational expression of the rotation elements included in the power distribution integration mechanism 30. FIG. 5 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (2) is readily introduced from the alignment chart of FIG. 5. Two upward thick arrows on the axis 'R' in FIG. 5 respectively show a torque transmitted to the ring gear shaft 32a when the torque Te* is output from the engine 22 in steady operation at a specific drive point of the target rotation speed Ne* and the target torque Te*, and a torque applied to the ring gear shaft 32a via the reduction gear 35 when a torque Tm2* is output from the motor MG2. Equation (3) is a relational expression of feedback control to drive and rotate the motor MG1 at the target rotation speed Nm1*. In Equation (3) given above, 'k3' in the second term and 'k4' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques that may be output from the motor MG2, according to Equations (4) and (5) given below (step S280):

$$Tmin = (Win - Tm1^* \cdot Nm1)/Nm2 \quad (4)$$

$$Tmax = (Wout - Tm1^* \cdot Nm1)/Nm2 \quad (5)$$

The lower torque restriction Tmin is given by dividing a difference between the input limit Win of the battery 50 and power consumption (power generation) of the motor MG1, which is the product of the torque command Tm1* and the input current rotation speed Nm1 of the motor MG1, by the input current rotation speed Nm2 of the motor MG2. The upper torque restriction Tmax is given by dividing a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (6) given below (step S290):

$$Tm2tmp = (Tr^* + Tm1^*/\rho)/Gr \quad (6)$$

The CPU 72 limits the tentative motor torque Tm2tmp to the range between the calculated lower torque restriction Tmin and upper torque restriction Tmax to set the torque command Tm2* of the motor MG2 (step S300). Setting the torque command Tm2* of the motor MG2 in this manner restricts the torque demand Tr* to be output to the ring gear shaft 32a or the driveshaft within the ranges of the input limit Win and the output limit Wout of the battery 50. Equation (6) is readily introduced from the alignment chart of FIG. 5.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S310) and exits from the constant speed drive control routine of FIG. 2. The engine ECU 24 receives the settings of the target rotation speed Ne* and the target torque Te* and performs fuel injection control and ignition control of the engine 22 to drive the engine 22 at a specified drive point of the target rotation speed Ne* and the target torque Te*. The motor ECU 40 performs the operations described above in response to reception of the settings of the torque commands Tm1* and Tm2*.

Figure 6:
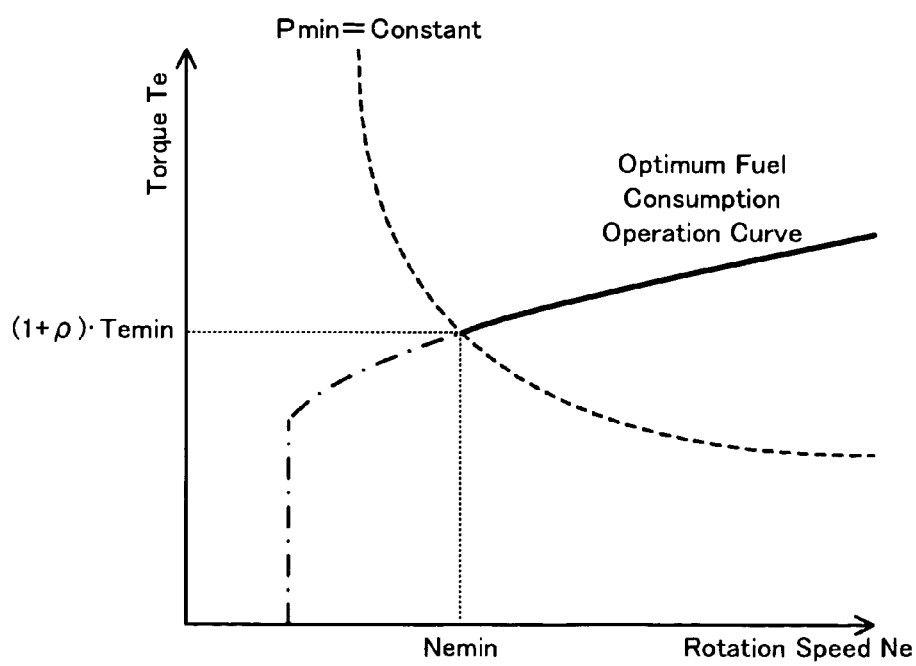
FIG. 6 shows a good fuel consumption range relative to the optimum fuel consumption operation curve.

When the eco switch signal ESW is set on (step S140: yes), selection of the fuel economy priority mode is identified. The absolute value of the vehicle speed difference ΔV is then compared with a preset reference speed Vref (step S200). The reference speed Vref specifies a proximity range where the vehicle speed V is close to the target vehicle speed V* and is set equal to, for example, 3 km/h or 5 km/h. When the absolute value of the vehicle speed difference ΔV is not lower than the preset reference speed Vref (step S200: no), it is determined that the vehicle speed V has not yet reached the proximity range close to the target vehicle speed V*. The CPU 72 accordingly performs the series of constant speed drive control in the normal drive mode described above (steps S150 to S190 and steps S270 to S310) to make the vehicle speed V quickly approach to the target vehicle speed V*. When the absolute value of the vehicle speed difference ΔV is lower than the preset reference speed Vref (step S200: yes), on the other hand, the torque demand Tr* is compared with a good fuel consumption-assuring minimum torque Temin (step S210). The good fuel consumption-assuring minimum torque Temin is output to the ring gear shaft 32a or the driveshaft when the engine 22 is driven at a lower limit of a good fuel consumption range, which is defined by drive points of good fuel consumption among the drive points on the optimum fuel consumption operation curve. FIG. 6 shows the good fuel consumption range relative to the optimum fuel consumption operation curve. In the map of FIG. 6, the one-dot chain line specifies the optimum fuel consumption operation curve, and the thick solid line partly overlapping the optimum fuel consumption operation curve specifies the good fuel consumption range. The good fuel consumption-assuring minimum torque Temin represents a torque transmitted to the ring gear shaft 32a when the engine 22 outputs a torque $(1+\rho) \cdot \text{Temin}$ at a drive point of a good fuel consumption-assuring minimum power Pmin on the optimum fuel consumption operation curve, which is given as the lower limit of the good fuel consumption range. Among the drive points on the optimum fuel consumption operation curve, the drive points in the good fuel consumption range have the rotation speed Ne of not lower than a good fuel consumption-assuring minimum rotation speed Nemin.

When the torque demand Tr* is less than the good fuel consumption-assuring minimum torque Temin (step S210: no), it is determined that the engine 22 is not drivable at a drive point of good fuel consumption. The CPU 72 accordingly sets the value '0' to all the target rotation speed Ne* and the target torque Te* of the engine 22 and the torque command Tm1* of the motor MG1 to stop the operation of the engine 22 and to drive the hybrid vehicle 20 in the motor drive mode (steps S220 and S230). The smaller between the maximum motor torque Tmmax and the result of the division of the torque demand Tr* by the gear ratio Gr of the reduction gear 35 is set to the torque command Tm2* of the motor MG2 (step S240). The CPU 72 sends the target rotation speed Ne* and the target torque Te* of the engine 22 to the engine ECU 24 and the torque commands Tm1* and Tm2* of the motors MG1 and MG2 to the motor ECU 40 (step S310) and exits from the constant speed drive control routine of FIG. 2. This processing flow of steps S220 to S240 and S310 is identical with the processing flow of steps S160 to S180 and S310 described previously.

When the torque demand Tr* is not less than the good fuel consumption-assuring minimum torque Temin (step S210: yes), on the other hand, the vehicle power demand P* is compared with the good fuel consumption-assuring minimum power Pmin (step S250). When the vehicle power demand P* is not less than the good fuel consumption-assuring minimum power Pmin (step S250: no), the target rotation speed Ne* and the target torque Te* of the engine 22 are set according to the vehicle power demand P* and the optimum fuel consumption operation curve (step S190). When the vehicle power demand P* is less than the good fuel consumption-assuring minimum power Pmin (step S250: yes), on the other hand, the good fuel consumption-assuring minimum rotation speed Nemin (see FIG. 6) and a torque $(1+\rho) \cdot \text{Temin}$, which specify a drive point of the engine 22 for outputting the good fuel consumption-assuring minimum power Pmin, are respectively set to the target rotation speed Ne* and the target torque Te* of the engine 22 (step S260). The torque commands Tm1* and Tm2* of the motors MG1 and MG2 are then set corresponding to the target rotation speed Ne* and the target torque Te* of the engine 22 (steps S270 to S300). The CPU 72 sends the target rotation speed Ne* and the target torque Te* of the engine 22 to the engine ECU 24 and the torque commands Tm1* and Tm2* of the motors MG1 and MG2 to the motor ECU 40 (step S310) and exits from the constant speed drive control routine of FIG. 2.

Figure 7:
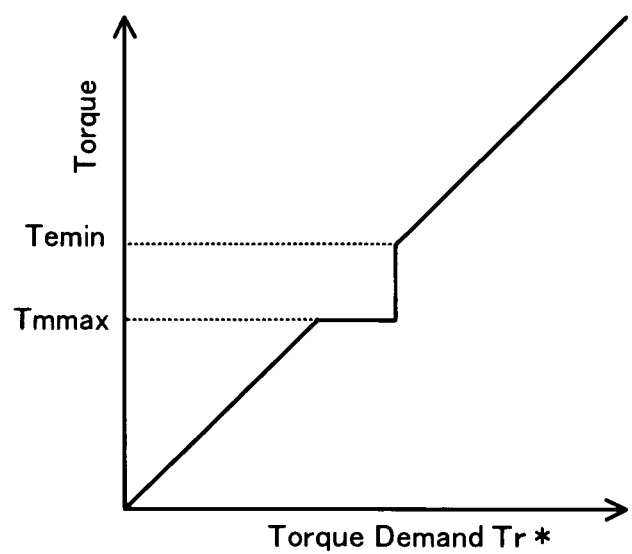
FIG. 7 is a graph showing a variation in torque output to a ring gear shaft against torque demand Tr*.

In one example, the torque demand Tr* increases to or above the good fuel consumption-assuring minimum torque Temin. Here it is assumed that the motor MG2 can output a torque of or over the result of division of the good fuel consumption-assuring minimum torque Temin by the gear ratio Gr of the reduction gear 35, irrespective of the vehicle speed V. On this assumption, when the torque demand Tr* is less than the good fuel consumption-assuring minimum torque Temin, the output torque from the motor MG2 satisfies the torque demand Tr* to be output to the ring gear shaft 32a. When the torque demand Tr* is not less than the good fuel consumption-assuring minimum torque Temin, on the other hand, the output power of the engine 22 satisfies the torque demand Tr* to be output to the ring gear shaft 32a. As mentioned previously, however, the maximum motor torque Tmmax has the greater value against the lower rotation speed Nm2 of the motor MG2 and decreases with an increase in rotation speed Nm2 of the motor MG2 as shown in the graph of FIG. 3. The good fuel consumption-assuring minimum torque Temin transmitted to the ring gear shaft 32a during operation of the engine 22 for outputting the good fuel consumption-assuring minimum power Pmin is constant, irrespective of the vehicle speed V. The result of the division of the good fuel consumption-assuring minimum torque Temin by the gear ratio Gr of the reduction gear 35 may thus be greater than the maximum motor torque Tmmax under the condition of the high vehicle speed V, which leads to the relatively high rotation speed Nm2 of the motor MG2. In this case, when the torque demand Tr* is smaller than but is close to the good fuel consumption-assuring minimum torque Temin, the maximum motor torque Tmmax of smaller than the result of the division of the torque demand Tr* by the gear ratio Gr of the reduction gear 35 is set to the torque command Tm2* of the motor MG2. In the fuel economy priority mode, under the condition of the high vehicle speed V, the torque output to the ring gear shaft 32a linearly increases to the maximum motor torque Tmmax with a variation in torque demand Tr*. The output torque to the ring gear shaft 32a is temporarily kept at the maximum motor torque Tmmax, has a stepwise change to the good fuel consumption-assuring minimum torque Temin, and again linearly increases with the variation in torque demand Tr*. The profile of this variation in output torque to the ring gear shaft 32a is shown in FIG. 7. Even in the case of the partial stepwise change of the output torque to the ring gear shaft 32a, the operation of the engine 22 in the good fuel consumption range effectively enhances the fuel efficiency, compared with the constant speed drive of the engine 22 in the normal drive mode.

As described above, in the case of the on setting of the eco switch signal ESW, when the torque demand Tr* is less than the good fuel consumption-assuring minimum torque Temin, the hybrid vehicle 20 of the embodiment stops the operation of the engine 22 and controls the motor MG2 to output the required torque for the constant speed drive. When the torque demand Tr* is not less than the good fuel consumption-assuring minimum torque Temin, on the other hand, the engine 22 is driven at the drive point in the good fuel consumption range among the drive points on the optimum fuel consumption operation curve to ensure output of the required torque for the constant speed drive. Such control enhances the fuel efficiency for the constant speed drive. When the vehicle speed V is not close to the target vehicle speed V*, in spite of the on setting of the eco switch signal ESW, the hybrid vehicle 20 of the embodiment is driven in the normal drive mode to ensure output of the required torque for the constant speed drive. Such drive control enables a quick approach of the vehicle speed V to the target vehicle speed V* and ensures the smooth constant speed drive. This arrangement satisfies both the enhanced fuel efficiency and the smooth constant speed drive. The on-off setting of the eco switch signal ESW allows the driver's selection between the constant speed drive in the fuel economy priority mode and the constant speed drive in the normal drive mode.

Figure 8:
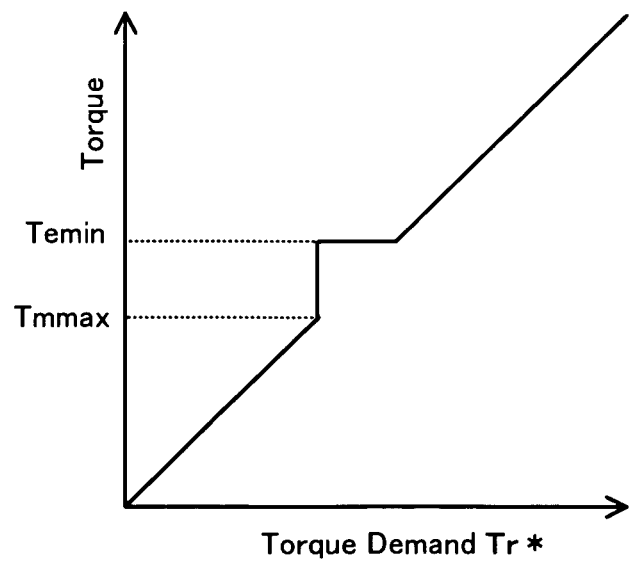
FIG. 8 is a graph showing a variation in torque output to the ring gear shaft against torque demand Tr* in one modified example.

On condition that the eco switch signal ESW is set on, that the vehicle speed difference ΔV is lower than the preset reference speed Vref, and that the torque demand Tr* is less than the good fuel consumption-assuring minimum torque Temin, the hybrid vehicle 20 of the embodiment stops the operation of the engine 22 and sets the torque command Tm2* of the motor MG2 to ensure output of the torque demand Tr* to the ring gear shaft 32a within the range of the maximum motor torque Tmmax. In one possible modification, on condition that the eco switch signal ESW is set on and that the vehicle speed difference ΔV is lower than the preset reference speed Vref, before reach of the torque demand Tr* to the maximum motor torque Tmmax, the hybrid vehicle may stop the operation of the engine 22 and set the torque command Tm2* of the motor MG2 to ensure output of the torque demand Tr* to the ring gear shaft 32a. After the reach of the torque demand Tr* to the maximum motor torque Tmmax, the engine 22 is driven to ensure output of the torque demand Tr* to the ring gear shaft 32a within the range of not smaller than the good fuel consumption-assuring minimum torque Temin. In this modified arrangement, the output torque to the ring gear shaft 32a increasing with a variation in torque demand Tr* is temporarily kept at the good fuel consumption-assuring minimum torque Temin as shown in FIG. 8.

When the vehicle speed V is not close to the target vehicle speed V*, that is, when the vehicle speed difference ΔV is not lower than the preset reference speed Vref, in spite of the on setting of the eco switch signal ESW, the hybrid vehicle 20 of the embodiment performs the constant speed drive control in the normal drive mode. In one possible modification, when the rate of change of the vehicle speed V is not lower than a predetermined threshold value, the hybrid vehicle may perform the constant speed drive control in the normal drive mode, irrespective of the vehicle speed difference ΔV. In another possible modification, on condition that the vehicle speed V is not close to the target vehicle speed V* and that the eco switch signal ESW is set on, when the torque demand Tr* is less than the good fuel consumption-assuring minimum torque Temin, the hybrid vehicle may stop the operation of the engine 22 and control the motor MG2 to output the required torque for the constant speed drive. Under the same conditions, when the torque demand Tr* is not less than the good fuel consumption-assuring minimum torque Temin, the engine 22 may be driven at the drive point in the good fuel consumption range to ensure output of the required torque for the constant speed drive.

Figure 9:
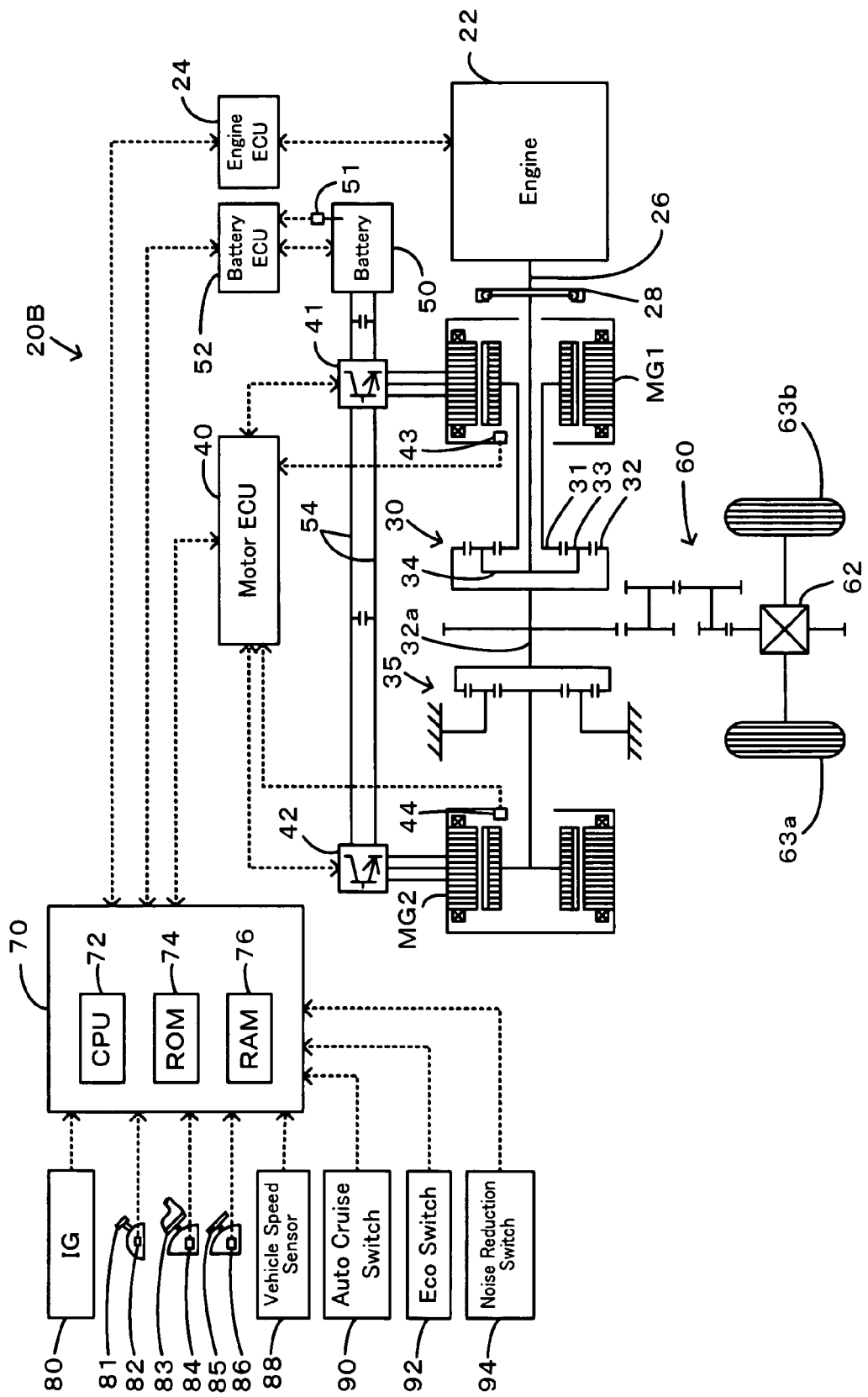
FIG. 9 schematically illustrates the configuration of another hybrid vehicle in a second embodiment of the invention.

Another hybrid vehicle 20B is described below as a second embodiment of the invention. FIG. 9 schematically illustrates the configuration of the hybrid vehicle 20B of the second embodiment. The hybrid vehicle 20B of the second embodiment has the same configuration as that of the hybrid vehicle 20 of the first embodiment, except input of a noise reduction switch signal SSW to the input port of the hybrid electronic control unit 70. The noise reduction switch signal SSW is output from a noise reduction switch 94 that is operated by the driver to change over the drive mode between the normal drive mode and a noise reduction mode for preventing the occurrence of noise. In order to avoid the duplicated explanation, the like hardware elements in the hybrid vehicle 20B of the second embodiment to those in the hybrid vehicle 20 of the first embodiment are expressed by the like numerals and symbols and are not specifically described here.

As mentioned above, the hybrid vehicle 20B of the second embodiment has the noise reduction switch 94, in addition to the eco switch 92 provided in the hybrid vehicle 20 of the first embodiment. The drive control of the second embodiment changes over its control mode, based on the on-off setting of the eco switch 92 and the on-off setting of the noise reduction switch 94. There are three different options of the control mode: the normal drive mode in the case of the off settings of both the eco switch 92 and the noise reduction switch 94, the fuel economy priority mode in the case of the on setting of the eco switch 92, and the noise reduction mode in the case of the on setting of the noise reduction switch 94. In the case of the on settings of both the eco switch 92 and the noise reduction switch 94, the drive control is performed in the fuel economy priority mode. The reason of this selection will be described later.

Figure 10:
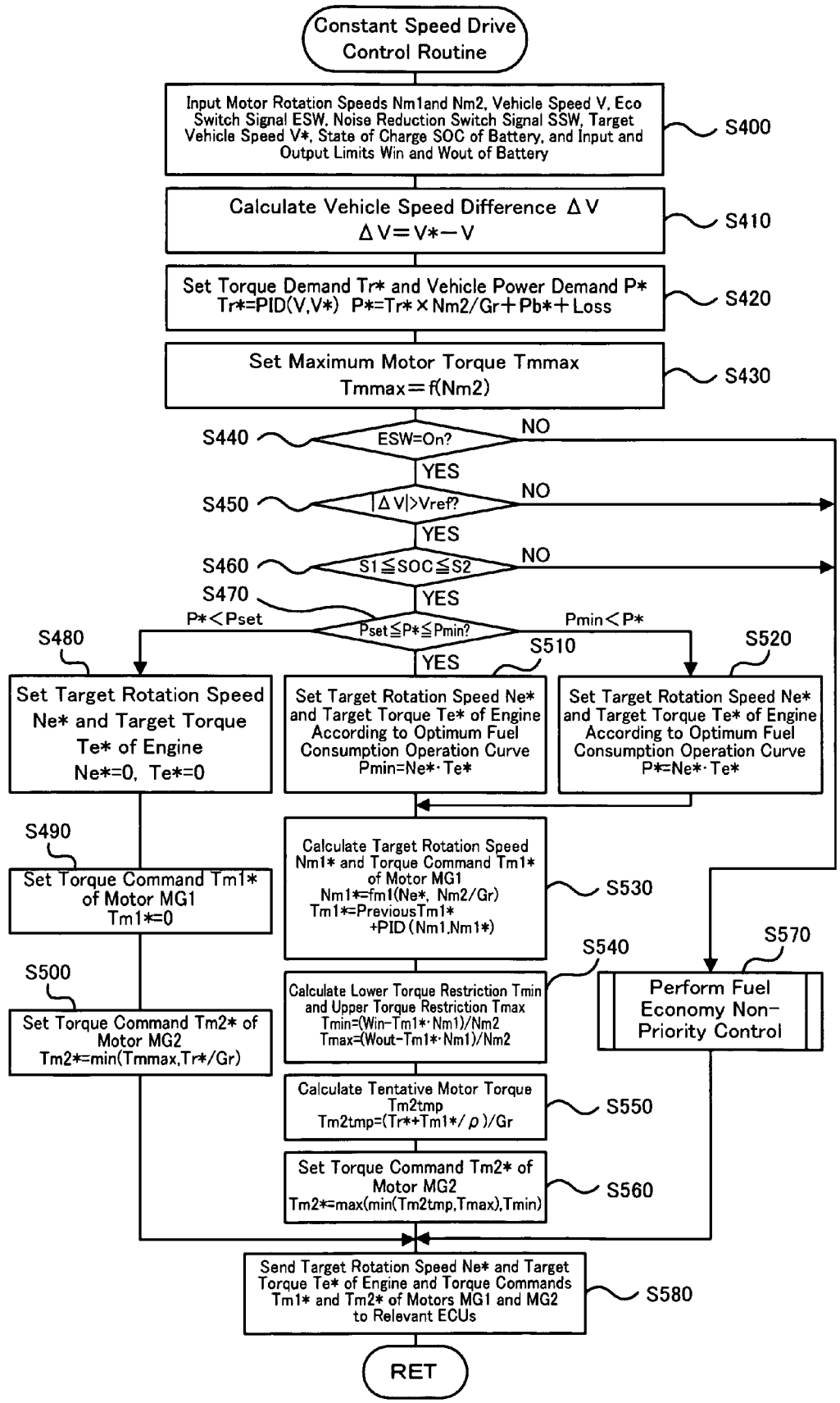
FIG. 10 is a flowchart showing a constant speed drive control routine executed by the hybrid electronic control unit in the hybrid vehicle of the second embodiment.

In the hybrid vehicle 20B of the second embodiment, a constant speed drive control routine shown in the flowchart of FIG. 10 is repeatedly executed, in response to the driver's operation of the auto cruise switch 90 to give an instruction of constant speed drive and to set the target vehicle speed V* for the constant speed drive. In the constant speed drive control routine of FIG. 10, the CPU 72 of the hybrid electronic control unit 70 first inputs various data required for control, that is, the vehicle speed V from the vehicle speed sensor 88, the rotation speeds Nm1 and Nm2 of the motors MG1 and MG2, the target vehicle speed V*, the eco switch signal ESW from the eco switch 92, the noise reduction switch signal SSW from the noise reduction switch 94, a remaining charge level or current state of charge (SOC) of the battery 50, and the input limit Win and the output limit Wout of the battery 50 (step S400). The inputs of the rotation speeds Nm1 and Nm2 of the motors MG1 and MG2, the target vehicle speed V*, and the input and output limits Win and Wout of the battery 50 are described previously in the first embodiment. The state of charge (SOC) of the battery 50 is computed from integration of charge-discharge current of the battery 50 measured by a current sensor (not shown) and is received from the battery ECU 52.

After the data input, the CPU 72 calculates the difference (vehicle speed difference) ΔV between the input target vehicle speed V* and the current vehicle speed V (step S410). In order to cancel out the calculated vehicle speed difference ΔV, the CPU 72 calculates the torque demand Tr* to be output to the ring gear shaft 32a or the driveshaft linked to the drive wheels 63a and 63b as the torque required for the hybrid vehicle 20 according to Equation (1) given above, while computing the vehicle power demand P* required for the hybrid vehicle 20 from the calculated torque demand Tr* (step S420). The maximum motor torque Tmmax possibly output from the motor MG2 is set corresponding to the rotation speed Nm2 of the motor MG2 (step S430). The processing flow of steps S410 to S430 is identical with the processing flow of steps S110 to S130 in the constant speed drive control routine of the first embodiment shown in the flowchart of FIG. 2.

The CPU 72 then checks the setting of the input eco switch signal ESW (step S440). In the off setting of the eco switch signal ESW (step S440: no), the CPU 72 does not activate the fuel economy priority mode but performs fuel economy non-priority control either in the normal drive mode or in the noise reduction mode (step S570). The details of the fuel economy non-priority control will be described later. In the on setting of the eco switch signal ESW (step S440: yes), on the other hand, the CPU 72 compares the absolute value of the vehicle speed difference ΔV with a preset reference speed Vref (step S450) and determines whether the state of charge (SOC) of the battery 50 is in a range of a lower threshold value S1 to an upper threshold value S2 (step S460). The reference speed Vref specifies a proximity range where the vehicle speed V is close to the target vehicle speed V* and is set equal to, for example, 3 km/h or 5 km/h. The lower and upper threshold values S1 and S2 are used to identify whether the battery 50 is neither close to a full charge level nor close to a full discharge level. For example, the lower threshold value S1 is set equal to 30% or 40%, and the upper threshold value S2 is set equal to 80% or 70%. When the absolute value of the vehicle speed difference ΔV is not higher than the preset reference speed Vref (step S450: no) or when the state of charge (SOC) of the battery 50 is out of the range of the lower threshold value S1 to the upper threshold value S2 (step S460 no), in spite of the driver's selection of the fuel economy priority mode, the fuel economy non-priority control is performed in the normal drive mode (step S570).

On condition that the eco switch signal ESW is set on (step S440: yes), that the absolute value of the vehicle speed difference ΔV is higher than the preset reference speed Vref (step S450: yes), and that the state of charge (SOC) of the battery 50 is in the range of the lower threshold value S1 to the upper threshold value S2 (step S460: yes), the vehicle power demand P* is compared with the engine start power Pset and the good fuel consumption-assuring minimum power Pmin (step S470). When the vehicle power demand P* is less than the engine start power Pset, the target rotation speed Ne* and the target torque Te* of the engine 22 and the torque command Tm1* of the motor MG1 are all set equal to 0 (steps S480 and S490) to stop the operation of the engine 22 and to drive the hybrid vehicle 20B in the motor drive mode. The smaller between the maximum motor torque Tmmax and the result of division of the torque demand Tr* by the gear ratio Gr of the reduction gear 35 is set to the torque command Tm2* of the motor MG2 (step S500). The CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S580) and terminates the constant speed drive control routine of FIG. 10. In response to input of the target rotation speed Ne* and the target torque Te* set both equal to 0, the engine ECU 24, in the operation state of the engine 22, stops fuel injection control and ignition control to stop the operation of the engine 22, and in the operation stop state of the engine 22, keeps the engine 22 stop its operation. The motor ECU 40 receives the torque commands Tm1* and Tm2* of the motors MG1 and MG2 and performs switching control of the switching elements included in the inverters 41 and 42 to drive the motors MG1 and MG2 with the torque commands Tm1* and Tm2*.

When the vehicle power demand P* is not less than the engine start power Pset and is not greater than the good fuel consumption-assuring minimum power Pmin, the target rotation speed Ne* and the target torque Te* of the engine 22 are set according to the optimum fuel consumption operation curve shown in FIG. 6 with substitution of the vehicle power demand P* into the good fuel consumption-assuring minimum power Pmin (step S510). The CPU 72 calculates the target rotation speed Nm1* of the motor MG1 from the target rotation speed Ne* of the engine 22, the rotation speed Nr (=Nm2/Gr) of the ring gear shaft 32a, and the gear ratio ρ of the power distribution integration mechanism 30 according to Equation (2) given above, while calculating the torque command Tm1* of the motor MG1 from the calculated target rotation speed Nm1* and the current rotation speed Nm1 of the motor MG1 according to Equation (3) given above (step S530). The CPU 72 then calculates the lower torque restriction Tmin and the upper torque restriction Tmax as the minimum and maximum torques that may be output from the motor MG2 from the input and output limits Win and Wout of the battery 50 and the calculated torque command Tm1* of the motor MG1, according to Equations (4) and (5) given above (step S540). The CPU 72 then calculates the tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (6) given above (step S550). The CPU 72 limits the tentative motor torque Tm2tmp to the range between the calculated lower torque restriction Tmin and upper torque restriction Tmax to set the torque command Tm2* of the motor MG2 (step S560). The CPU 72 sends the target rotation speed Ne* and the target torque Te* of the engine 22 to the engine ECU 24 and the torque commands Tm1* and Tm2* of the motors MG1 and MG2 to the motor ECU 40 (step S580) and exits from the constant speed drive control routine of FIG. 10. The engine ECU 24 receives the settings of the target rotation speed Ne* and the target torque Te* and performs fuel injection control and ignition control of the engine 22 to drive the engine 22 at the specified drive point of the target rotation speed Ne* and the target torque Te*. The motor ECU 40 performs the switching control as described above. Such setting of the target rotation speed Ne* and the target torque Te* of the engine 22 with substitution of the vehicle power demand P* into the good fuel consumption-assuring minimum power Pmin effectively enhances the fuel efficiency for the constant speed drive.

When the vehicle power demand P* is greater than the good fuel consumption-assuring minimum power Pmin, the target rotation speed Ne* and the target torque Te* of the engine 22 are set according to the optimum fuel consumption operation curve and the vehicle power demand P* (step S520). The torque commands Tm1* and Tm2* of the motors MG1 and MG2 are calculated from the target rotation speed Ne* (steps S530 to S560) as described above. The CPU 72 sends the target rotation speed Ne* and the target torque Te* of the engine 22 to the engine ECU 24 and the torque commands Tm1* and Tm2* of the motors MG1 and MG2 to the motor ECU 40 (step S580) and exits from the constant speed drive control routine of FIG. 10.

Figure 11:
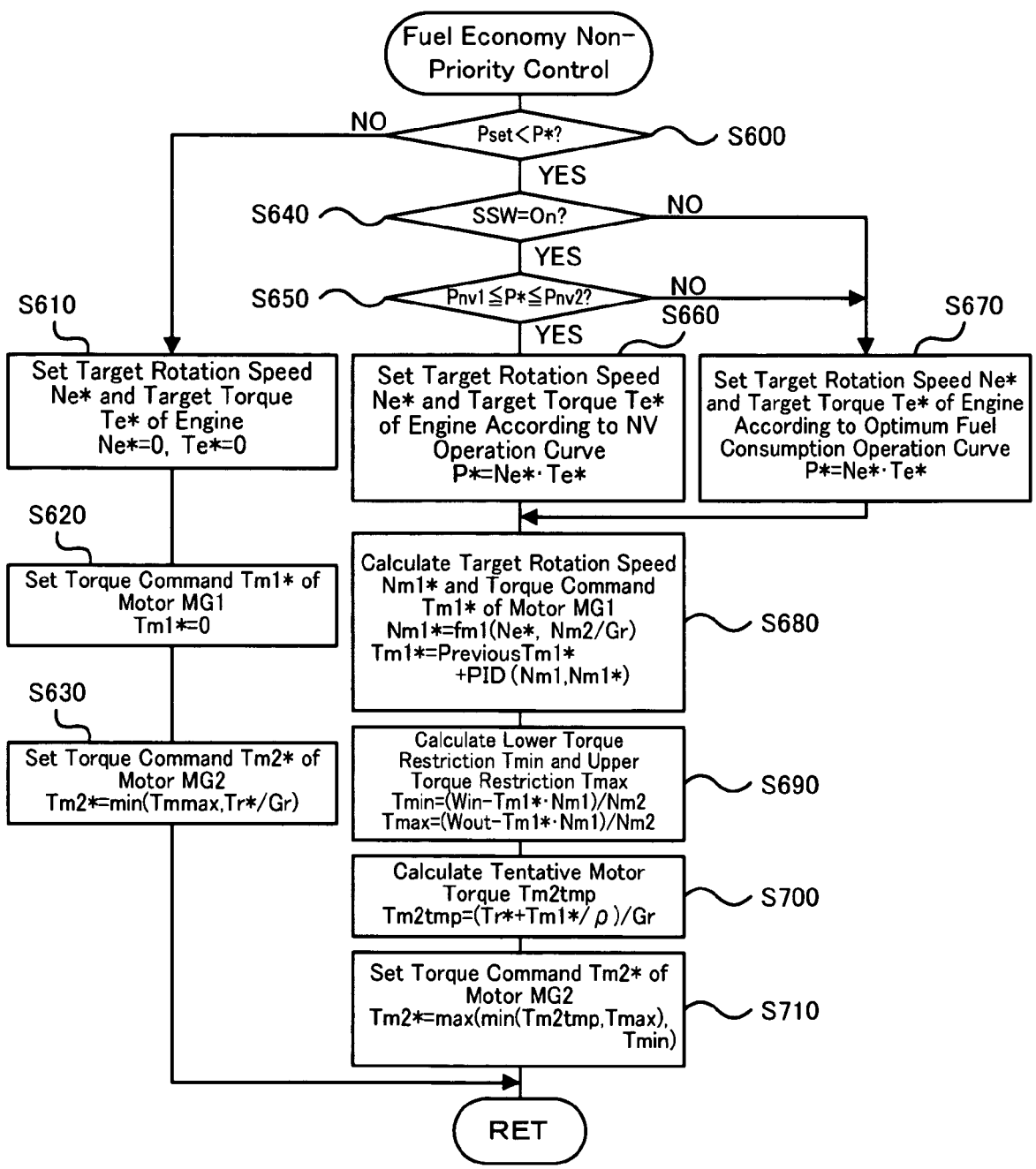
FIG. 11 is a flowchart showing the details of fuel economy non-priority control performed at step S570 in the constant speed drive control routine of FIG. 10.

When the eco switch signal ESW is set off (step S440: no), when the absolute value of the vehicle speed difference ΔV is not higher than the preset reference speed Vref (step S450: no), or when the state of charge (SOC) of the battery 50 is out of the range of the lower threshold value S1 to the upper threshold value S2 (step S460: no), the fuel economy non-priority control is performed according to the flowchart of FIG. 11. The fuel economy non-priority control first compares the vehicle power demand P* with the engine start power Pset (step S600). When the vehicle power demand P* is less than the engine start power Pset (step S600: no), the target rotation speed Ne* and the target torque Te* of the engine 22 and the torque command Tm1* of the motor MG1 are all set equal to 0 (steps S610 and S620) to stop the operation of the engine 22 and to drive the hybrid vehicle 20B in the motor drive mode. The smaller between the maximum motor torque Tmmax and the result of division of the torque demand Tr* by the gear ratio Gr of the reduction gear 35 is set to the torque command Tm2* of the motor MG2 (step S630). On conclusion of the fuel economy non-priority control of FIG. 11, the processing flow goes to step S580 in the constant speed drive control routine of FIG. 10. The CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S580) and terminates the constant speed drive control routine of FIG. 10.

Figure 12:
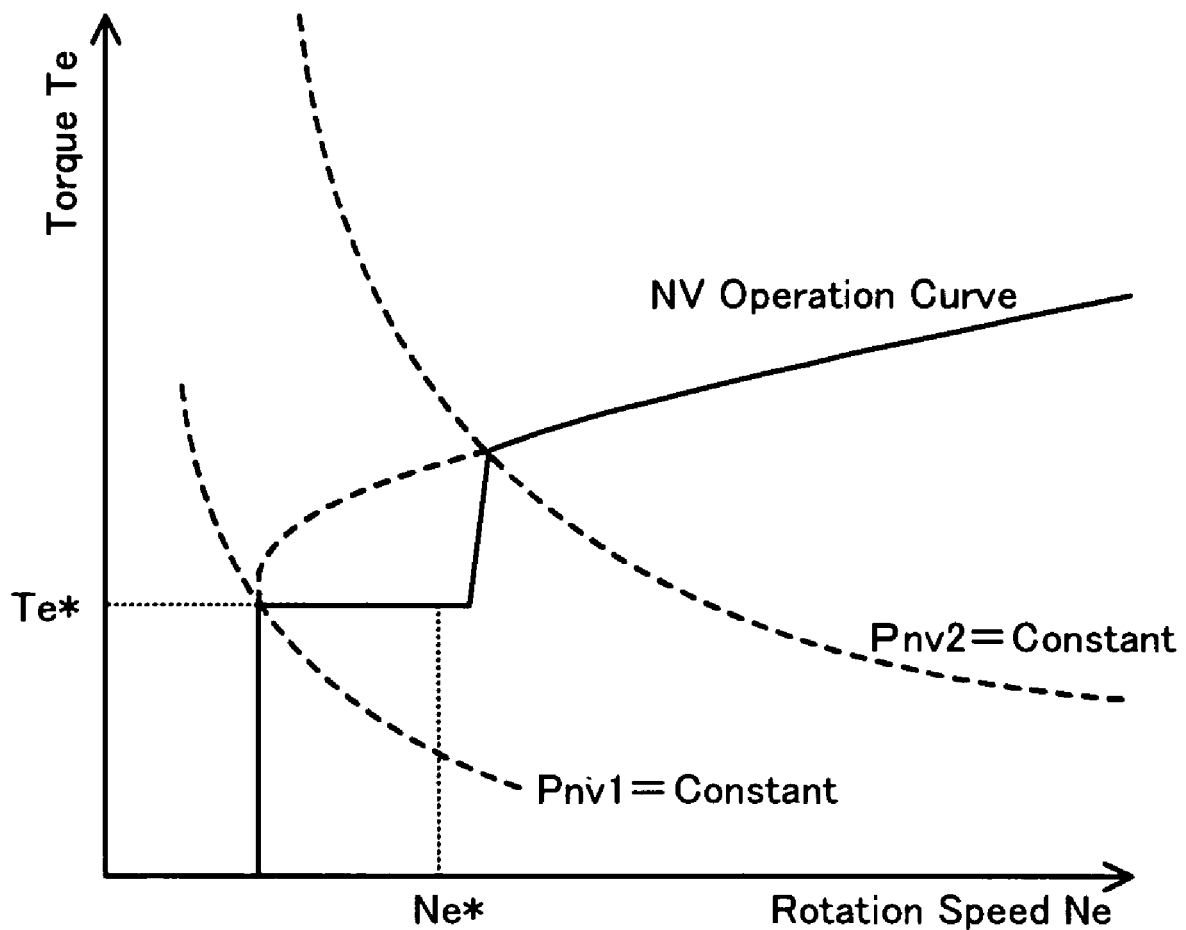
FIG. 12 shows an NV operation curve to set the target rotation speed Ne* and the target torque Te* of the engine.

When the vehicle power demand P* is not less than the engine start power Pset (step S600: yes), on the other hand, the CPU 72 checks the setting of the input noise reduction switch signal SSW (step S640). In the case of the on setting of the noise reduction switch signal SSW (step S640: yes), the CPU 72 determines whether the vehicle power demand P* is in a noise occurrence range between a lower threshold value Pnv1 and an upper threshold value Pnv2 (step S650). When the vehicle power demand P* is in the noise occurrence range (step S650: yes), the target rotation speed Ne* and the target torque Te* of the engine 22 are set according to an NV operation curve for noise reduction and the vehicle power demand P* (step S660). The CPU 72 subsequently sets the torque commands Tm1* and Tm2* of the motors MG1 and MG2 (steps S680 to S710). The processing flow of steps S680 to S710 in the fuel economy non-priority control of FIG. 11 is identical with the processing flow of steps S270 to S300 in the constant speed drive control routine of FIG. 2. The CPU 72 then sends the settings of the target rotation speed Ne* and the target torque Te* of the engine 22 to the engine ECU 24 and the settings of the torque commands Tm1* and Tm2* of the motors MG1 and MG2 to the motor ECU 40 (step S580) and terminates the constant speed drive control routine of FIG. 10. One example of the NV operation curve is shown in FIG. 12. The NV operation curve is defined by the drive points of the engine 22 on the optimum fuel consumption operation curve with omission of a low rotation speed—high torque range. There is muffled sound in this low rotation speed—high torque range. In this embodiment, a minimum power in the low rotation speed—high torque range or the muffled sound range on the optimum fuel consumption operation curve is set to the lower threshold value Pnv1, and a maximum power of the muffled sound range is set to the upper threshold value Pnv2. Setting the target rotation speed Ne* and the target torque Te* of the engine 22 according to the NV operation curve effectively prevents the occurrence of muffled sound and protects the driver and the passengers from uneasiness or discomfort. As mentioned above, the fuel economy priority mode is activated in the case of the on settings of both the eco switch 92 and the noise reduction switch 94. This is ascribed to the fact that the good fuel consumption-assuring minimum power Pmin is greater than the upper threshold value Pnv2 as clearly shown by the comparison between the NV operation curve of FIG. 12 and the optimum fuel consumption operation curve of FIG. 6. In the fuel economy priority mode, the operation of the engine 22 is restricted to the condition of greater than the good fuel consumption-assuring minimum power Pmin. Namely there is no need of taking into account the possible occurrence of noise in the fuel economy priority mode.

When the noise reduction switch signal SSW is set off (step S640: no) or when the vehicle power demand P* is out of the noise occurrence range (step S650: no) in the on setting of the noise reduction switch signal SSW, the target rotation speed Ne* and the target torque Te* of the engine 22 are set according to the optimum fuel consumption operation curve and the vehicle power demand P* (step S670). The CPU 72 subsequently sets the torque commands Tm1* and Tm2* of the motors MG1 and MG2 (steps S680 to S710). The processing flow of steps S680 to S710 in the fuel economy non-priority control of FIG. 11 is identical with the processing flow of steps S270 to S300 in the constant speed drive control routine of FIG. 2. The CPU 72 then sends the settings of the target rotation speed Ne* and the target torque Te* of the engine 22 to the engine ECU 24 and the settings of the torque commands Tm1* and Tm2* of the motors MG1 and MG2 to the motor ECU 40 (step S580) and terminates the constant speed drive control routine of FIG. 10.

As described above, in the case of the on setting of the eco switch signal ESW, when the vehicle power demand P* is not greater than the good fuel consumption-assuring minimum power Pmin, the hybrid vehicle 20B of the second embodiment drives the engine 22 at the drive point in the good fuel consumption range among the drive points on the optimum fuel consumption operation curve to ensure output of the required torque for the constant speed drive. Such control enhances the fuel efficiency for the constant speed drive. The engine 22 is driven at the drive point in the good fuel consumption range only when the vehicle speed V is not close to the target vehicle speed V*. This arrangement satisfies both the enhanced fuel efficiency and the smooth constant speed drive. The engine 22 is driven at the drive point in the good fuel consumption range only when the state of charge (SOC) of the battery 50 is in the range of the lower threshold value S1 and the upper threshold value S2. This condition effectively prevents overcharge and over-discharge of the battery 50.

In the hybrid vehicle 20B of the second embodiment, in the case of the on setting of the noise reduction switch signal SSW, the engine 22 is driven at the drive point on the NV operation curve, which is equal to the optimum fuel consumption operation curve with omission of the muffled sound range, to ensure output of the required torque for the constant speed drive. Such control enables the constant speed drive without the occurrence of noise. This arrangement effectively prevents the occurrence of muffled sound during the constant speed drive and protects the driver and the passengers from uneasiness or discomfort.

In the hybrid vehicle 20B of the second embodiment, the fuel economy priority mode is activated in the case of the on settings of both the eco switch 92 and the noise reduction switch 94. This is ascribed to the fact that the good fuel consumption-assuring minimum power Pmin is greater than the upper threshold value Pnv2. When the good fuel consumption-assuring minimum power Pmin is less than the upper threshold value Pnv2, the noise reduction mode may be activated in the case of the on settings of both the eco switch 92 and the noise reduction switch 94.

The hybrid vehicle 20B of the second embodiment uses the eco switch signal ESW and the noise reduction switch signal SSW to selectively activate one of the three control modes, that is, the normal drive mode, the fuel economy priority mode, and the noise reduction mode. The available options of the control mode are not restricted to these three modes but may additionally include other modes or may be only two selected among these three modes.

In the hybrid vehicle 20B of the second embodiment, in the case of the on setting of the eco switch signal ESW, the engine 22 is driven at the drive point in the good fuel consumption range for the constant speed drive only when the vehicle speed V is not close to the target vehicle speed V*. In one possible modification, the engine 22 may be driven at the drive point in the good fuel consumption range for the constant speed drive even when the vehicle speed V is close to the target vehicle speed V*. In another possible modification, the engine 22 may be driven at the drive point in the good fuel consumption range for the constant speed drive only when the vehicle speed V is close to the target vehicle speed V*.

Figure 13:
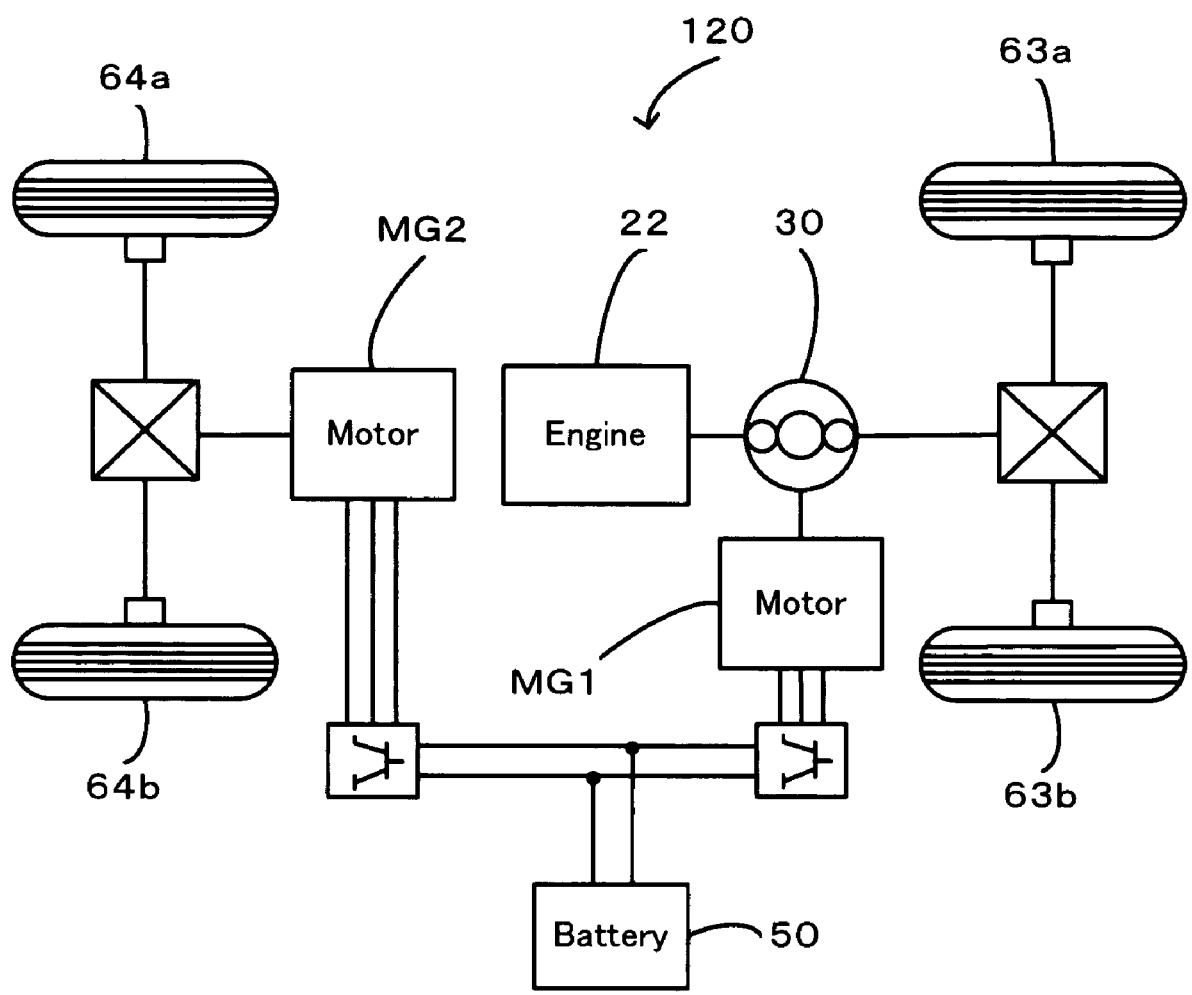
FIG. 13 schematically illustrates the configuration of another hybrid vehicle in one modified example.

In the hybrid vehicles 20 and 20B of the first and second embodiments, the power of the motor MG2 is subjected to gear change by the reduction gear 35 and is output to the ring gear shaft 32a. In one possible modification shown as a hybrid vehicle 120 of FIG. 13, the power of the motor MG2 may be output to another axle (that is, an axle linked with wheels 64a and 64b), which is different from an axle connected with the ring gear shaft 32a (that is, an axle linked with the driving wheels 63a and 63b).

Figure 14:
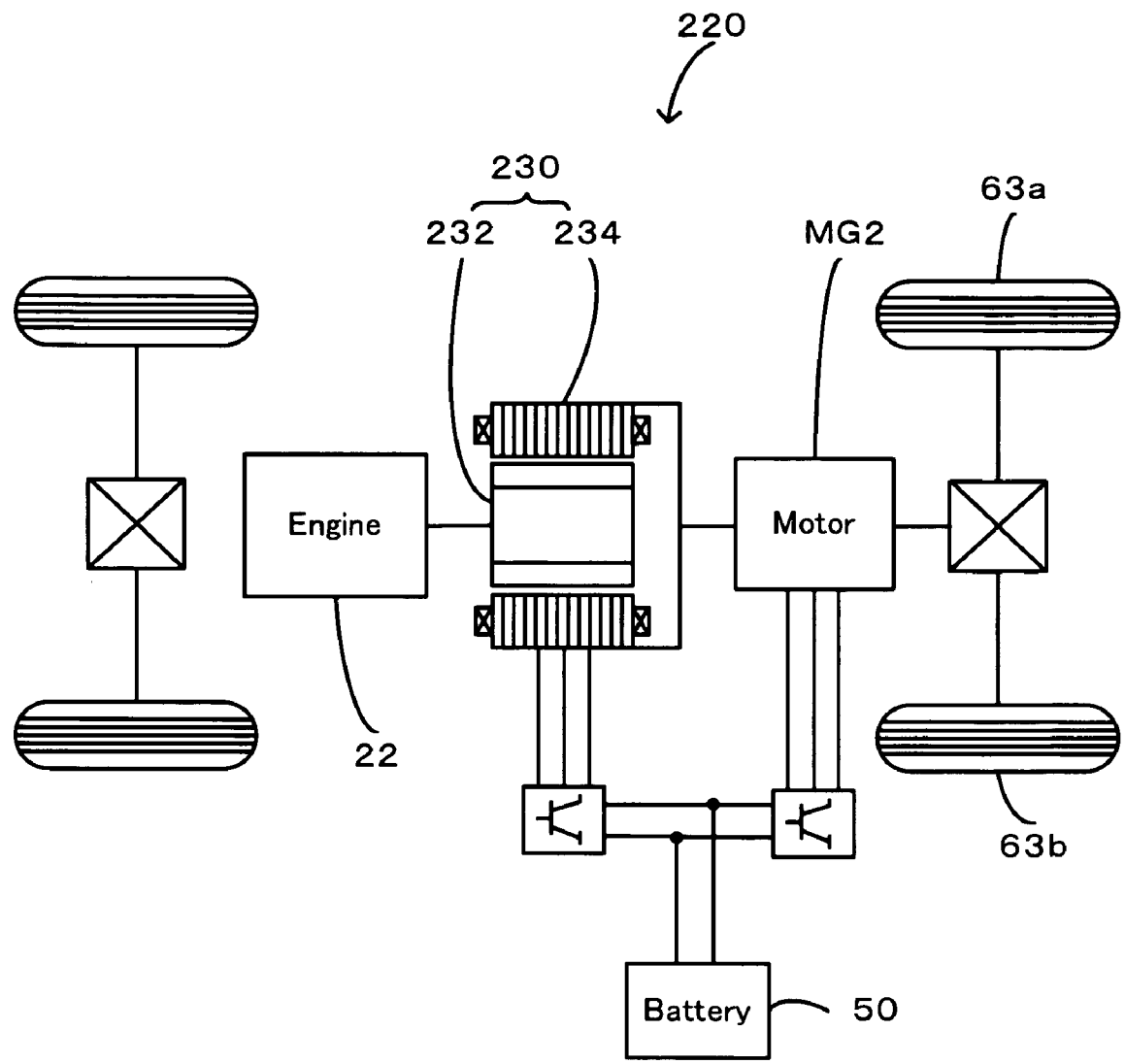
FIG. 14 schematically illustrates the configuration of still another hybrid vehicle in another modified example.

In the hybrid vehicles 20 and 20B of the first and second embodiments, the power of the engine 22 is output via the power distribution integration mechanism 30 to the ring gear shaft 32a functioning as the drive shaft linked with the driving wheels 63a and 63b. In another possible modification of FIG. 14, a hybrid vehicle 220 may have a pair-rotor motor 230, which has an inner rotor 232 connected with the crankshaft 26 of the engine 22 and an outer rotor 234 connected with the drive shaft for outputting the power to the driving wheels 63a, 63b and transmits part of the power output from the engine 22 to the drive shaft while converting the residual part of the power into electric power.

In the hybrid vehicles 20 and 20B of the first and the second embodiments and their modified examples, part of the output power of the engine 22 is transmitted to the ring gear shaft 32a or the driveshaft by the operation of the motor MG1 or by the operation of the pair-rotor motor 230. The technique of the invention is not restricted to the configurations of these embodiments or modified examples but may be applied to any configuration that allows a motor drive mode and ensures transmission of at least part of the output power of an engine to an axle.

The first and the second embodiments described above regard the hybrid vehicles 20 and 20B. The technique of the invention may be actualized by any of diverse vehicles including automobiles and non-automobiles, as well as by a control method of the hybrid vehicle.

The embodiment and its modified examples discussed above are to be considered in all aspects as illustrative and not restrictive. There may be many other modifications, changes, and alterations without departing from the scope or spirit of the main characteristics of the present invention.

The disclose of Japanese Patent Application No. 2005-340371 filed Nov. 25, 2005 including specification, drawings and claims is incorporated herein by reference in its entirety.

What is claimed is:

1. A hybrid vehicle, comprising:
    an internal combustion engine that is driven to output power for driving the hybrid vehicle;
    a motor that is driven to output power for driving the hybrid vehicle;
    a target vehicle speed setting unit that sets a target vehicle speed for constant speed drive of the hybrid vehicle;
    a mode selection unit that selectively activates either a normal drive mode or a fuel economy priority mode, which places the greater importance on fuel efficiency, in response to a driver's operation;
    a vehicle speed measurement unit that measures a vehicle speed; and
    a constant speed drive control module that, during normal constant speed drive with selective activation of the normal drive mode by the mode selection unit and with setting of the target vehicle speed by the target vehicle speed setting unit, controls the internal combustion engine and the motor to drive the internal combustion engine on a specific drive point curve satisfying a predetermined condition with possible intermittent operation and to make the measured vehicle speed approach to the set target vehicle speed,
    during fuel economy-priority constant speed drive with selective activation of the fuel economy priority mode by the mode selection unit and with setting of the target vehicle speed by the target vehicle speed setting unit, the constant speed drive control module controlling the internal combustion engine and the motor to drive the internal combustion engine in an efficient drive point range on the specific drive point curve satisfying the predetermined condition and to make the measured vehicle speed approach to the set target vehicle speed.

2. The hybrid vehicle in accordance with claim 1, wherein during the fuel economy-priority constant speed drive, when a vehicle speed difference between the measured vehicle speed and the set target vehicle speed is not less than a preset reference value, the constant speed drive control module controls the internal combustion engine and the motor to drive the internal combustion engine on the specific drive point curve satisfying the predetermined condition and to make the measured vehicle speed approach to the set target vehicle speed,
    during the fuel economy-priority constant speed drive, when the vehicle speed difference between the measured vehicle speed and the set target vehicle speed is less than the preset reference value, the constant speed drive control module controlling the internal combustion engine and the motor to drive the internal combustion engine in the efficient drive point range and to make the measured vehicle speed approach to the set target vehicle speed.

3. The hybrid vehicle in accordance with claim 1, wherein the constant speed drive control module controls the internal combustion engine and the motor to increase output of a constant speed driving force with an increase in vehicle speed difference between the measured vehicle speed and the set target vehicle speed, in order to cancel out the vehicle speed difference.

4. The hybrid vehicle in accordance with claim 3, wherein during the fuel economy-priority constant speed drive, when operation of the internal combustion engine in the efficient drive point range causes output of a driving force of not less than the constant speed driving force, the constant speed drive control module stops the operation of the internal combustion engine and controls the motor to output the constant speed driving force.

5. The hybrid vehicle in accordance with claim 4, wherein during the fuel economy-priority constant speed drive, when operation of the internal combustion engine in the efficient drive point range causes output of the driving force of not less than the constant speed driving force but when the motor is not allowed to output the constant speed driving force, the constant speed drive control module controls the motor to output an allowable level of driving force until output of the constant speed driving force is enabled from the internal combustion engine driven in the efficient drive point range.

6. The hybrid vehicle in accordance with claim 4, wherein during the fuel economy-priority constant speed drive, when operation of the internal combustion engine in the efficient drive point range causes output of the driving force of not less than the constant speed driving force but when the motor is not allowed to output the constant speed driving force, the constant speed drive control module controls the internal combustion engine to be driven in the efficient drive point range.

7. The hybrid vehicle in accordance with claim 1, wherein the predetermined condition is that the internal combustion engine is driven at an efficient drive point among drive points of outputting an identical power, and
in the efficient drive point range, the internal combustion engine is driven at a rotation speed of not lower than a preset level.

8. The hybrid vehicle in accordance with claim 1, further comprising an electric power-mechanical power input output mechanism that is connected with an output shaft of the internal combustion engine and with an axle of the hybrid vehicle and outputs at least part of the output power of the internal combustion engine to the axle through input and output of electric power and mechanical power.

9. The hybrid vehicle in accordance with claim 8, wherein the electric power-mechanical power input output mechanism has: a three shaft power input output module that is linked to three shafts, the output shaft of the internal combustion engine, the axle, and a rotating shaft, and inputs and outputs power from and to a residual one shaft based on powers input from and output to any two shafts among the three shafts; and a generator that inputs and outputs power from and to the rotating shaft.

10. The hybrid vehicle in accordance with claim 8, wherein the electric power-mechanical power input output mechanism has a pair-rotor motor that has a first rotor connected to the output shaft of the internal combustion engine and a second rotor connected to the axle and is driven to rotate through relative rotation of the first rotor to the second rotor.

11. The hybrid vehicle comprising:
an internal combustion engine that is driven to output power for driving the hybrid vehicle;
a motor that is driven to output power for driving the hybrid vehicle;
a target vehicle speed setting unit that sets a target vehicle speed for constant speed drive of the hybrid vehicle;
a mode selection unit that selects a control mode, in response to a driver's operation, wherein the mode selection unit selects the control mode among plural options including a normal drive mode where the internal combustion engine is driven on a specific drive point curve satisfying a predetermined condition, a fuel economy priority mode where the internal combustion engine is driven in an efficient drive point range on the specific drive point curve satisfying the predetermined condition, and a noise reduction mode where the internal combustion engine is driven in a noise reduction drive point range satisfying a noise reduction condition for preventing occurrence of certain noise;
a vehicle speed measurement unit that measures a vehicle speed; and
a constant speed drive control module that, in the case of setting the target vehicle speed by the target vehicle speed setting unit, controls the internal combustion engine and the motor in the selected control mode to make the measured vehicle speed approach to the set target vehicle speed with intermittent operation of the internal combustion engine.

12. The hybrid vehicle in accordance with claim 11, wherein in the case of selection of the fuel economy priority mode, when a vehicle speed difference between the measured vehicle speed and the set target vehicle speed is less than a preset reference value, the constant speed drive control module controls the internal combustion engine and the motor to drive the internal combustion engine on the specific drive point curve satisfying the predetermined condition and to make the measured vehicle speed approach to the set target vehicle speed,
in the case of selection of the fuel economy priority mode, when the vehicle speed difference between the measured vehicle speed and the set target vehicle speed is not less than the preset reference value, the constant speed drive control module controlling the internal combustion engine and the motor to drive the internal combustion engine in the efficient drive point range and to make the measured vehicle speed approach to the set target vehicle speed.

13. The hybrid vehicle in accordance with claim 11, wherein in the case of selection of the noise reduction mode, when a vehicle speed difference between the measured vehicle speed and the set target vehicle speed is less than a preset reference value, the constant speed drive control module controls the internal combustion engine and the motor to drive the internal combustion engine on the specific drive point curve satisfying the predetermined condition and to make the measured vehicle speed approach to the set target vehicle speed,
in the case of selection of the noise reduction mode, when the vehicle speed difference between the measured vehicle speed and the set target vehicle speed is not less than the preset reference value, the constant speed drive control module controlling the internal combustion engine and the motor to drive the internal combustion engine in the noise reduction drive point range satisfying the noise reduction condition and to make the measured vehicle speed approach to the set target vehicle speed.

14. The hybrid vehicle in accordance with claim 11, further comprising an accumulator unit that is capable of inputting and outputting electric power from and to the motor,
wherein when *a state of charge of the accumulator unit is in a predetermined range, the constant speed drive control module controls the internal combustion engine and the motor in the control mode selected by the mode selection unit to make the measured vehicle speed approach to the set target vehicle speed,
when the state of charge of the accumulator unit is out of the predetermined range, the constant speed drive control module controlling the internal combustion engine and the motor in the normal drive mode, regardless of the control mode selected by the mode selection unit, to make the measured vehicle speed approach to the set target vehicle speed.

15. The hybrid vehicle in accordance with claim 11, wherein the predetermined condition is that the internal combustion engine is driven at an efficient drive point among drive points of outputting an identical power, in the efficient drive point range, the internal combustion engine is driven at a rotation speed of not lower than a preset level, and the noise reduction condition is omission of a low rotation speed—high torque operation range of the internal combustion engine from the predetermined condition.

16. The hybrid vehicle in accordance with claim 11, further comprising an electric power-mechanical power input output mechanism that is connected with an output shaft of the internal combustion engine and with an axle of the hybrid vehicle and outputs at least part of the output power of the internal combustion engine to the axle through input and output of electric power and mechanical power.

17. The hybrid vehicle in accordance with claim 16, wherein the electric power-mechanical power input output mechanism has: a three shaft power input output module that is linked to three shafts, the output shaft of the internal combustion engine, the axle, and a rotating shaft, and inputs and outputs power from and to a residual one shaft based on powers input from and output to any two shafts among the three shafts; and a generator that inputs and outputs power from and to the rotating shaft.

18. The hybrid vehicle in accordance with claim 16, wherein the electric power-mechanical power input output mechanism has a pair-rotor motor that has a first rotor connected to the output haft of the internal combustion engine and a second rotor connected to the axle and is driven to rotate through relative rotation of the first rotor to the second rotor.

19. A control method of a hybrid vehicle, the hybrid vehicle having: an internal combustion engine that is driven to output power for driving the hybrid vehicle; a motor that is driven to output power for driving the hybrid vehicle; a target vehicle speed setting switch that is operated to set a target vehicle speed for constant speed drive of the hybrid vehicle; and a mode selection switch that is operated by a driver to select either a normal drive mode or a fuel economy priority mode, which places the greater importance on fuel efficiency, in the case of selection of the normal drive mode by the driver's operation of the mode selection switch and setting of the target vehicle speed by the target vehicle speed setting switch, the control method controlling the internal combustion engine and the motor to drive the internal combustion engine on a specific drive point curve satisfying a predetermined condition with possible intermittent operation and to make the measured vehicle speed approach to the set target vehicle speed, in the case of selection of the fuel economy priority mode by the driver's operation of the mode selection switch and setting of the target vehicle speed by the target vehicle speed setting switch, the control method controlling the internal combustion engine and the motor to drive the internal combustion engine in an efficient drive point range on the specific drive point curve satisfying the predetermined condition and to make the measured vehicle speed approach to the set target vehicle speed.

20. A control method of a hybrid vehicle, the hybrid vehicle having: an internal combustion engine that is driven to output power for driving the hybrid vehicle; a motor that is driven to output power for driving the hybrid vehicle; a target vehicle speed setting switch that is operated to set a target vehicle speed for constant speed drive of the hybrid vehicle; and a mode selection switch that is operated by a driver to select a control mode, the mode selection switch selects the control mode among plural options including a normal drive mode where the internal combustion engine is driven on a specific drive point curve satisfying a predetermined condition, a fuel economy priority mode where the internal combustion engine is driven in an efficient drive point range on the specific drive point curve satisfying the predetermined condition, and a noise reduction mode where the internal combustion engine is driven in a noise reduction drive point range satisfying a noise reduction condition for preventing occurrence of certain noise, in the case of setting the target vehicle speed by the target vehicle speed setting switch, the control method controlling the internal combustion engine and the motor in the control mode selected by the driver's operation of the mode selection switch to make the measured vehicle speed approach to the set target vehicle speed with intermittent operation of the internal combustion engine.

* * * * *

UNITED STATES PATENT AND TRADEMARK OFFICE
CERTIFICATE OF CORRECTION

PATENT NO. : 7,632,212 B2
APPLICATION NO. : 11/602282
DATED : December 15, 2009
INVENTOR(S) : Akihiro Yamanaka et al.

It is certified that error appears in the above-identified patent and that said Letters Patent is hereby corrected as shown below:

| Column | Line | |
|---|---|---|
| 5 | 32 | Change "haft" to --shaft--. |
| 18 | 9 | Change "keeps" to --makes--. |
| 23 | 54 | Change "The hybrid" to --A hybrid--. |
| 24 | 58 | Change "when *a" to --when a--. |
| 25 | 33 | Change "output haft" to --output shaft--. |

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,632,212 B2 Page 1 of 1
APPLICATION NO. : 11/602282
DATED : December 15, 2009
INVENTOR(S) : Akihiro Yamanaka It is certified that error appears in the above-identified patent and that said Letters Patent is hereby corrected as shown below:

On the Title Page,

Item [*] Notice: Subject to any disclaimer, the term of this patent is extended or adjusted under 35 U.S.C. by 486 days.

Delete the phrase "by 486 days" and insert --by 510 days--

Signed and Sealed this

Twentieth Day of July, 2010

David J. Kappos
*Director of the United States Patent and Trademark Office*